(12) United States Patent
Agarwal

(10) Patent No.: US 6,931,009 B1
(45) Date of Patent: Aug. 16, 2005

(54) FRAME FORMAT AND FRAME ASSEMBLING/DISASSEMBLING METHOD FOR THE FRAME FORMAT

(75) Inventor: Anil K. Agarwal, Gaithersburg, MD (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 09/485,145

(22) PCT Filed: Jul. 15, 1998

(86) PCT No.: PCT/US98/14198

§ 371 (c)(1),
(2), (4) Date: Jan. 18, 2000

(87) PCT Pub. No.: WO99/04340

PCT Pub. Date: Jan. 28, 1999

Related U.S. Application Data

(60) Provisional application No. 60/052,359, filed on Jul. 15, 1997.

(51) Int. Cl.[7] ............... H04L 12/28; H04J 3/14; G06F 11/00; G08C 15/00
(52) U.S. Cl. ............... 370/395; 370/252; 370/468; 370/473; 714/708; 714/774
(58) Field of Search ............... 370/395, 474, 370/473, 471, 468, 252, 328, 338, 329, 330, 392, 401; 714/708, 774, 751, 755, 776, 781, 819

(56) References Cited

U.S. PATENT DOCUMENTS

| | | | |
|---|---|---|---|
| 5,007,045 A | | 4/1991 | Tsuzuki |
| 5,050,166 A | * | 9/1991 | Cantoni et al. ............ 370/473 |
| 5,214,642 A | * | 5/1993 | Kunimoto et al. ......... 370/471 |
| 5,229,992 A | | 7/1993 | Jurkevich et al. |
| 5,247,516 A | * | 9/1993 | Bernstein et al. .......... 370/468 |
| 5,282,202 A | * | 1/1994 | Bernstein et al. .......... 370/468 |
| 5,282,207 A | * | 1/1994 | Jurkevich et al. .......... 370/468 |
| 5,425,029 A | * | 6/1995 | Hluchyj et al. ......... 370/395.6 |
| 5,461,618 A | | 10/1995 | Chen et al. |
| 5,535,221 A | * | 7/1996 | Hijikata et al. ............ 714/708 |
| 5,592,468 A | * | 1/1997 | Sato ........................ 370/252 |
| 5,600,653 A | * | 2/1997 | Chitre et al. ............... 370/474 |
| 5,642,421 A | | 6/1997 | Gray et al. |
| 6,331,978 B1 | * | 12/2001 | Ravikanth et al. .......... 370/392 |
| 6,442,149 B1 | * | 8/2002 | Nakano et al. ............. 370/328 |
| 6,477,669 B1 | * | 11/2002 | Agarwal et al. ............ 714/708 |
| 6,661,781 B1 | * | 12/2003 | Chitre et al. ............... 370/330 |

FOREIGN PATENT DOCUMENTS

WO  97/16046 A1  5/1997

\* cited by examiner

*Primary Examiner*—Man Phan
(74) *Attorney, Agent, or Firm*—Sughrue Mion, PLLC

(57) ABSTRACT

A method of assembling a plurality of frames including cell/packet-formatted data according to a predetermined frame format for transmission in a communication signal in a wireless or satellite environment. The method begins by assembling a data payload for each frame having a first variable size, including at least one of a partial data cell/packet and a complete data cell/packet. Then, for each frame a block code having a second variable size is generated for use in error correction. Each frame is provided with a frame header which defines aspects of said frame. Finally, the data payload, the block code and the format header are combined to form a frame corresponding to the plurality of frames, the format header defining a first portion of the frame, the data payload defining a second portion of the frame and the block code defining a third portion of the frame.

48 Claims, 16 Drawing Sheets

FRAME FORMAT AND FRAME ASSEMBLING/DISASSEMBLING METHOD FOR THE FRAME FORMAT

The present application is based on U.S. provisional application Ser. No. 60/052,359 filed on Jul. 15, 1997 and priority therefrom is claimed under 35 U.S.C. §120. The entire content of Provisional Application Ser. No. 60-052, 359 is incorporated herein by reference.

FIELD OF THE INVENTION

The present invention relates to the efficient and reliable transmission of packet or cell-based information, such as frame relay, SS#7, ISDN, Internet or asynchronous transfer mode (ATM)-based information, via wireless links. More specifically, the present invention relates to a frame format for a communication signal containing a bit stream including packet- or cell-formatted data. While the present invention is applicable all of the foregoing and other similar types of cell or packet-based transmission formats, the ATM format will be the exemplary focus of one preferred embodiment for purposes of providing an enabling disclosure, written description and best mode for the present invention.

BACKGROUND OF THE INVENTION

There are a variety of methods for transmitting information via a broadband Integrated Services Digital Network (B-ISDN), using a variety of protocols related to Asynchronous Transport Mode (ATM), frame relay mode, ISDN and SS#7 modes, and Internet-mode of transmission. Each of these modes permit the transmission of an original stream of information by time-dividing it into a plurality of discrete cells or packets. As used in the field, packets may have a variable size but cells typically have a predetermined size, such as the 53-byte sized ATM cell. The ATM mode, as the exemplary preferred embodiment, was originally investigated by a group called the International Telephone and Telegraph Consultative Committee (CCITT). The group, currently called the International Telecommunication Union-Telecommunications Standards Sector (ITU-TSS), investigated a new form of ISDN that would have the flexibility to accommodate a large number of channels and the ability to transfer large amounts of data at a very fast rate. At the end of the study, the committee decided to adopt ATM as the target transfer mode for the B-ISDN. The ITU-TSS is currently defining the wide area network (WAN) standards for ATM.

ATM is a transfer mode that sends 53 octet packets (since the size is fixed, they also are considered as cells) of information across a network from one communication device to another. The 53 octets are comprised of 48 octets of data information, referred to as the payload, and 5 octets of header information (including the routing information). The header and data information must be organized into cells so that when the cells are filled, they can be sent when an open slot of 53 octets becomes available.

Although ATM based transmission, switching, and network technology has been employed in broadband integrated services digital networks (B-ISDN) which rely on fiber optics, there are numerous difficulties associated with implementing ATM based technology in a wireless communication network. Similar difficulties are found in other cell- or packet-based systems, such as frame relay, Internet, ISDN and SS#7 systems. These difficulties include the fact that cell or packet-based networks and switches rely on a number of high speed interfaces. These high-speed standard interfaces include OC-3 (155 Mbit/s), OC-12 (622 Mbit/s) and DS3 (45 Mbit/s). However, few cell- or packet-based networks and switches support lower speed interfaces, such as T1 (1.544 Mbit/s) and the programmable rate RS-449 interface.

As a consequence, there are only a few interfaces which can support the comparatively low transmission rates (less than 1 Mbit/s to a 8 Mbit/s) used in wireless communication. Although commercial satellite and wireless modems support these low transmission rates using an RS-449 programmable rate interface, it is difficult to implement cell- or packet-based technology in a wireless environment using conventional interfaces because most ATM traffic is transmitted over high rate data interfaces.

Another difficulty associated with implementing cell- or packet-based technology in a wireless communication network has to do with the fact that cell- or packet-based protocols rely on extremely low bit error ratios which are typical of fiber optics based networks. By way of example, ATM protocols assume that the transmission medium has very low Bit Error Ratios (BER) ($10^{-12}$) and that bit errors occur randomly.

In contrast, the bit error ratios associated with wireless communication are much higher (on the order of $10^{-3}$ to $10^{-8}$) and tend to fluctuate in accordance with atmospheric conditions. In addition, the errors associated with wireless communication tend to occur in longer bursts. Thus, a robust error correction scheme must be employed in a wireless network in which cell- or packet-based technology is to be implemented.

In addition to the difficulties discussed above, there is another significant constraint placed on wireless communication networks which is not imposed on terrestrial based fiber optics networks. This constraint has to do with the fact that the cost of bandwidth in a wireless network is much higher than for fiber optics networks. As a consequence of having been traditionally implemented in fiber optics networks, ATM-based technology is not particularly efficient in its use of transmission bandwidth. Therefore, if ATM-based technology is to be implemented in wireless networks, it must achieve a more efficient use of bandwidth. These same goals apply to ISDN/SS#7 and Internet transmissions, and those generally using TCP/IP protocols. However, no solution to problems blocking achievement of these goals is seen in the prior art.

For example, U.S. Pat. No. 5,568,482 relates to a low speed radio link system and method designed for ATM transport. The system is based on a data protocol which is compatible with non-wireless ATM based data transmission systems. The data protocol incorporates a frame format which allows for the transmission of ATM cells in low speed, high noise links. However, the data protocol is rigid and does not account for partial or compressed cells. Similarly, the reference fails to accommodate flexible data payloads or flexible block codes for error correction.

SUMMARY OF THE INVENTION

The present invention overcomes the above-mentioned problems associated with implementing cell- or packet-based technology in a wireless communication network by providing a frame format for a communication signal containing a bit stream that includes data formatted for asynchronous transfer mode (ATM), frame relay, ISDN/SS#7 and Internet protocols, or other packet or cell -formatted data.

In the ATM format, The bit stream is organized into a plurality of frames according to the frame format which includes a frame header, a data payload having a first variable size, and a block code having a second variable size which is used for error correction. According to the present invention, the data payload includes at least one of a partial ATM data cell and a complete ATM data cell.

Advantageously, the data payload may include at least one of a partial packet of compressed data and a complete packet of compressed data.

According to one aspect of the inventive frame format, the frame header may include a first header field which defines a number of data cells (e.g., ATM cells) or packets in the data payload. In the case of ATM, the number of ATM data cells includes only complete ATM data cells and any partial ATM data cell which follows the complete ATM data cells.

The frame header also includes a second header field which defines a size of a first partial ATM data cell that precedes any complete ATM data cells included in the data payload, and a third header field which defines a frame number of a corresponding one of the plurality of frames.

The frame header may also include a fourth header field which defines a predetermined characteristic of the block code in accordance with the frame number of the corresponding one of the plurality of frames. According to the inventive frame format, the predetermined characteristic may correspond to the second variable size of the block code.

According to another aspect of the inventive frame format, the second variable size of the block code depends on a bit error rate of the communication signal.

According to yet another aspect of the inventive frame format, the block code may correspond to Reed-Solomon Coding.

According to still yet another aspect of the inventive frame format, the data payload may also comprise a pattern for identifying the boundary of a corresponding frame in order to facilitate frame synchronization. Advantageously, the data payload may be filled entirely with the pattern, which may be a synchronization pattern.

According to a second embodiment of the invention, a method is provided for assembling a plurality of frames, including formatted data according to a predetermined frame format for transmission in a communication signal, e.g., asynchronous transfer mode (ATM), frame relay, Internet or ISDN/SS#7 format. The method includes the steps of assembling a data payload for each frame having a first variable size including at least one of a partial data cell or packet and a complete data cell or packet, generating for each frame a block code having a second variable size which is used for error correction, and providing for each frame a frame header which defines aspects of said frame.

The method also includes the step of combining the data payload, the block code and the format header to form a corresponding frame of said plurality of frames. According to the inventive method, the format header defines a first portion of the frame, the data payload defines a second portion of said frame and the block code defines a third portion of the frame.

According to one aspect of the inventive method, the data payload further comprises at least one of a partial packet of compressed data and a complete packet of compressed data. According to yet another aspect of the present invention, the inventive method further comprises the step of interleaving a group of said plurality of frames. The step of interleaving may include the steps of segmenting the frames of the group into a plurality of segments and rearranging the order of the plurality of segments within the group. Advantageously, the step of interleaving may be performed using a single buffer memory in accordance with the present invention.

According to a third embodiment of the present invention, a method is provided for disassembling a plurality of frames of a communication signal including, for example, asynchronous transfer mode (ATM), frame relay, Internet or ISDN/SS#7 formatted data. The frames each include, in accordance with a predetermined frame format, a frame header which defines aspects of a corresponding frame, a data payload having a first variable size, and a block code having a second variable size which is used for error correction.

According to the third embodiment of the present invention, the data payload includes at least one of a partial cell, a complete cell, a partial packet of compressed data and a complete packet of compressed data.

The method includes the steps of receiving a frame of the plurality of frames, decoding the block code of the frame, correcting errors of the frame created during a transmission thereof, and extracting from the data payload the at least one of the partial cell, the complete cell, the partial packet of compressed data and the complete packet of compressed data in accordance with information included in the frame header.

According to one aspect of the inventive method, a group of the plurality of frames may be interleaved. In addition, prior to the step of extracting the group of the plurality of frames is de-interleaved. According to yet another aspect of the present invention, the group of the plurality of frames comprises a plurality of segments and the step of de-interleaving further comprises the steps of rearranging the order of the plurality of segments within the group and recreating each of the frames of said group in an original form. According to still yet another aspect of the invention, the step of interleaving may be performed using a single buffer memory.

According to a fourth embodiment of the present invention, an apparatus is provided for assembling a plurality of frames, including asynchronous transfer mode (ATM), frame relay, Internet or ISDN/SS#7-formatted data according to a predetermined frame format for transmission in a communication signal. The apparatus includes an assembling circuit for assembling a data payload for each frame having a first variable size, the data payload, including at least one of a partial data cell and a complete data cell.

The apparatus also includes a generating circuit for generating a block code having a second variable size for each frame, the block code being generated for error correction, and a header generating circuit for generating a frame header for each frame which defines aspects of the frame.

The apparatus further includes a frame integrating circuit for combining the data payload, the block code and the format header to form a corresponding frame of the plurality of frames. The format header defines a first portion of the frame. The data payload defines a second portion of the frame and the block code defines a third portion of the frame.

According to one aspect of the present invention, the apparatus may further include an interleaving circuit for interleaving a group of the plurality of frames.

According to a fifth embodiment of the present invention, an apparatus is provided for disassembling a plurality of frames of a communication signal, including asynchronous transfer mode (ATM), frame relay, Internet and ISDN/SS#7-formatted data. The frames each include, in accordance with a predetermined frame format, a frame header which defines aspects of a corresponding frame, a data payload having a first variable size, and a block code having a second variable size which is used for error correction. The data payload includes at least one of a partial cell, a complete cell, a partial packet of compressed data and a complete packet of compressed data.

The apparatus includes a frame receiving circuit for receiving a frame of the plurality of frames, a decoding circuit for decoding the block code of the frame, the decoder correcting errors of the frame created during a transmission thereof.

The apparatus also includes a data extracting circuit for extracting from the data payload the at least one of the partial cell, the complete cell, the partial packet of compressed data and the complete packet of compressed data in accordance with information included in the frame header. The apparatus may also include a de-interleaving circuit for de-interleaving said group of said plurality of frames which are interleaved.

As used herein, the term "cell" shall be used to mean a fixed size container, such as the ATM cell, and the term "packet" shall be used to mean and a variable size container, and the term "cell/packet" shall mean generically either or both such container arrangements.

BRIEF DESCRIPTION OF THE DRAWINGS

These and other features, aspects and advantages of the present invention will become better understood with reference to the following description, appended claims, and accompanying drawings, in which:

DETAILED DESCRIPTION OF THE PREFERRED EMBODIMENTS

The present invention is directed to a frame format for a communication signal containing a bit stream, including ATM, frame relay, Internet, ISDN/SS#7 and other cell- and packet-formatted data. The present invention also incorporates a method of assembling frames according to the frame format, and a method of disassembling the frames.

The subject matter of the present invention encompasses one aspect of a cell- or packet-based technology that is incorporated into an interface between conventional cell- or packet-based technology and a wireless communication network. The interface was developed in order to facilitate the transmission of cell or packet-based traffic in a wireless communication network. However, the interface may also facilitate the transmission of cell- or packet-based traffic over a terrestrial based network. The above-mentioned interface for an ATM-format system is referred to as an ATM Link Accelerator (ALA), and is used herein by way of example in a preferred embodiment.

Figure 1A:
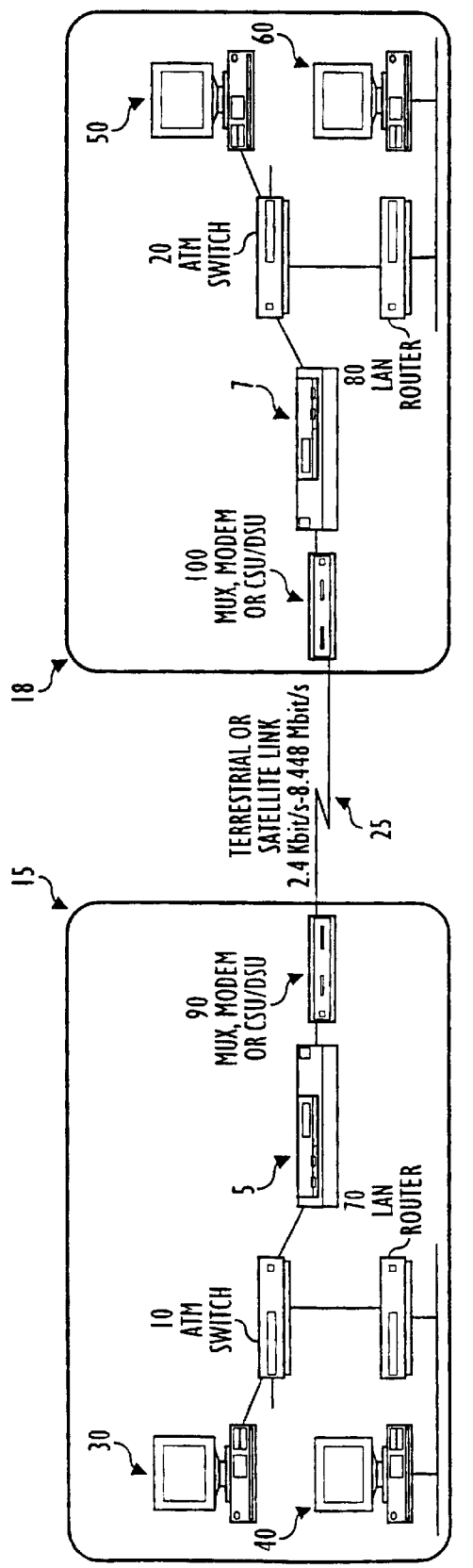
FIG. 1A shows an interface which implements the present invention.

FIG. 1A depicts interfaces 5 and 7 which each provide a means of interconnecting standard ATM switches 10 and 20 over a terrestrial or satellite link 25, in order to provide high quality service for ATM-based applications and to provide an efficient use of transmission link bandwidth.

The ATM switches 10 and 20 may be incorporated into local area networks 15 and 18 which include computers 30, 40, 50 and 60, and LAN routers 70 and 80. The interfaces 5 and 7 may connect to the terrestrial or satellite link 25 via modems 90 and 100 which implement the RS-449 programmable rate interface discussed above. Alternatively, a multiplexer, a channel service unite (CSU) or a digital service unit (DSU) may be used instead of a modem.

Figure 1B:
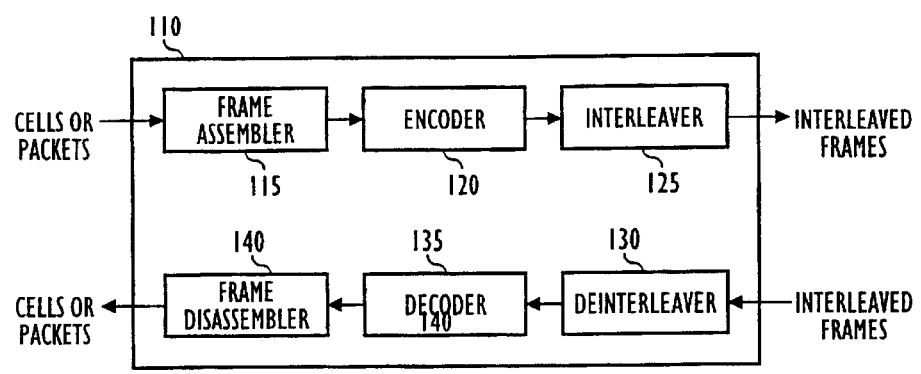
FIG. 1B shows a portion of an interface corresponding to the present invention.

FIG. 1B shows a portion of an interface 110 related to the present invention. The portion 110 includes a frame assembler 115, which forms the frames of a communication signal in accordance with the inventive format, an encoder 120 which generates a block code which is included in a corresponding frame for error correction of the frame, and an interleaver 125 which interleaves a group of individual frames in order to spread a burst of errors across each frame. The interface 110 also includes a deinterleaver 130 which deinterleaves an interleaved frame received across a transmission link in order to provide a group of individual frames, a decoder 135 which decodes the block code of a corresponding frame in order to provide error correction for the frame, and a frame disassembler 140 which disassembles a frame into its constituent parts in the manner described below.

According to the present invention, ATM based cells are organized into frames which are suitable for wireless communication. However, the present invention is equally applicable to terrestrial based communication. Advantageously, the header and data portions of each cell may be compressed so as to increase the effective bandwidth of the wireless communication link. Each frame can be efficiently packed with ATM cells and/or variable size packets which may be made up of compressed ATM cells. In addition, a portion of an ATM cell or variable size packet may be included in a frame for optimal efficiency.

The frames are subsequently encoded in order to provide for the necessary error correction. According to one aspect of the present invention, adaptive coding can be employed by which the proper amount of forward error-correction is computed on a real-time basis in accordance with the number of bit errors detected in the receive link. Thus, if the quality of the received information is high, reduced bits can be allocated for data correction.

In this manner, the right amount of coding can be selected for the measured link quality and this information can be conveyed to a remote interface continuously. Once the remote interface receives this information, it can change the frame format to include fewer or more coding bytes as necessary for all subsequent transmitted frames.

Error detection may be improved by interleaving the encoded signals. The use of interleaving techniques provides a way of spreading errors across multiple frames. In addition, the present invention employs a "convolutional" interleaving scheme which provides for better delay performance.

The present invention also employs a scheme for frame synchronization between a transmitting interface and a receiving interface. The scheme is carried out by filling the entire data "payload" portion of a frame with a pattern which is used by the receiver to determine where the frame's boundary is located. In this manner, a random search for a particular frame's boundary is avoided. Alternatively, only a portion of the data payload can be filled with the pattern.

The inventive frame format will now be discussed in greater detail with reference to FIG. 2. Each frame 200 shown in FIG. 2 corresponds to a fundamental unit of transmission over the WAN link. Each frame 200 is also a fixed size frame, which is n octets long. If interleaving is utilized then I frames are used to compose an "interleaved frame" 210. The interleaving technique of the present invention rearranges the order of the bytes in the interleaved frame and transmits each byte sequentially over a WAN link. However, there are no special synchronization bits employed within the frame structure.

Figure 2:
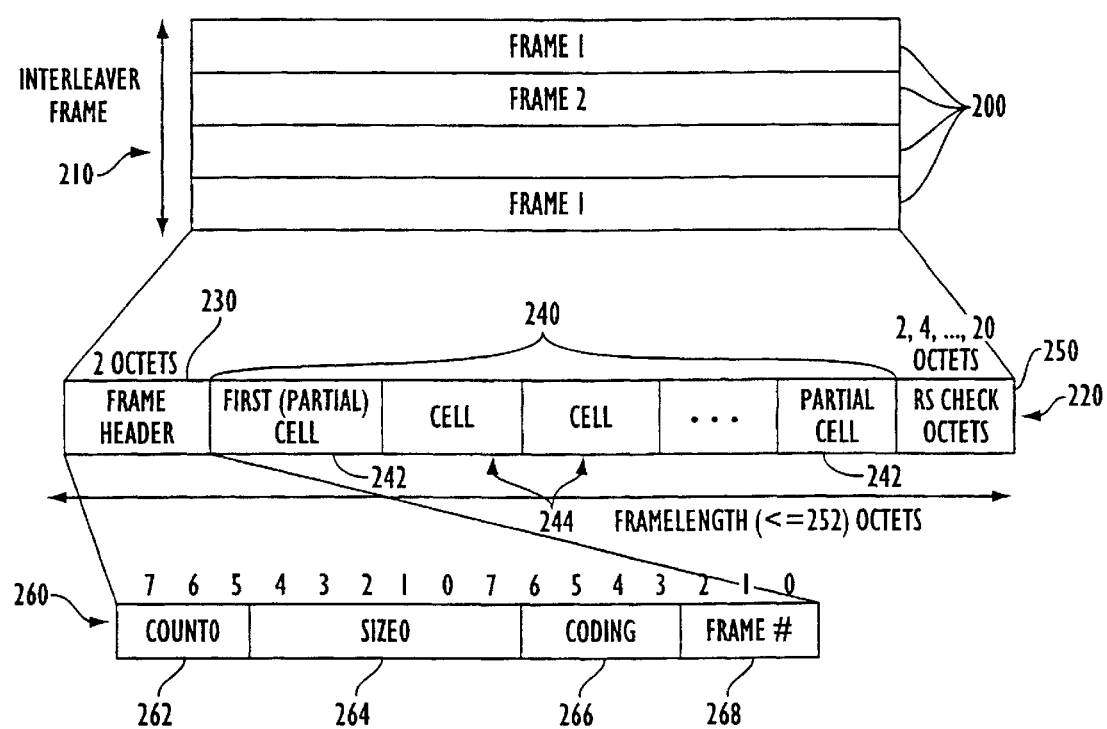
FIG. 2 shows a frame format according to the present invention.

An exemplary frame 220 is n bytes long and includes a frame header 230, a data payload 240, and a block code 250, as shown in FIG. 2. The header 230 is two octets long. The data payload 240 has a variable length which depends on the size of the block code. As noted above, the data payload 240 may contain a combination of partial or complete fixed-sized ATM cells 242 and 244 and variable-size packets (the packets, which are not shown, may contain one or more compressed ATM cells or some other data). The block code 250 has a length which corresponds to a multiple of octets (e.g. block coding length=2t, t>0). Advantageously, Reed-Solomon coding check-bytes may be provided as the block code 250.

Reed-Solomon coding is discussed in detail in the article, "The Application of Error Control to Communications" *IEEE Communications Magazine*, E. Berlecamp et al., vol. 25, no. 4, April 1987, pages 44–57, which is incorporated herein by reference.

The above-mentioned frame header 230 is made up of a number of fields. An exemplary frame header 260 includes first through fourth fields 262, 264, 266 and 268. The first field 262 contains the variable COUNT which defines the number of complete ATM cells in a frame, including any partial ATM cell which follows the complete ATM cells. The second field 264 contains the variable SIZE which defines the space within the data payload that is allocated for a first partial ATM cell to be contained therein. By way of example, the variable SIZE may be set equal to the number of octets reserved for the first partial ATM cell divided by four.

A third field 266 contains the variable FRAMENUM which defines the frame number. Frame numbers may range from 0–7 and repeat periodically.

Finally, a fourth field 268 contains a variable CODING which defines aspects of the corresponding block code 250 based on the frame number. By way of example, if the value of FRAMENUM is equal to zero, then the fourth field 268 (or coding field) represents a suggested value of the number of octets which are to be reserved for the block code 250. Advantageously, the block code 250 may be generated in accordance with Reed-Solomon Coding. If Reed-Solomon coding is employed then the coding field 268 represents a suggested value of the number of Reed-Solomon octets divided by two that the transmitting interface should employ for its own transmissions.

Reed-Solomon coding is implemented in the form of check-bytes which are generated by a standard Reed-Solomon algorithm based on the size of the frame in bytes and the number of check-bytes to be included within the corresponding frame.

If the receiving interface is not yet synchronized to its receiving bit stream, the coding field 268 is set to a predetermined value (e.g. 0xF). According to the present invention the coding field 268 cannot assume a value of zero, which corresponds to an invalid value.

If the value of FRAMENUM is equal 1, then the least significant bit of the coding field 268 is set 1 to represent the fact that an ATM cell header compression algorithm has been activated. If the value of FRAMENUM is equal to 2 or 3, then the coding field 269 may be set to zero.

If the value of FRAMENUM is greater than 3, then the coding field 268 is set to a number which is a function of the number of block coding octets that the transmitting interface should use for its own transmissions starting with the next frame numbered zero.

The rules for filling each frame's data payload with ATM cells and packets are described below.

If a previously transmitted frame contained a partial ATM cell or packet at the end of its data payload, the data payload of the current frame will begin with the remainder of that ATM cell or packet as long as there is enough space in the data payload. If there is not enough space in the data payload for the partial ATM cell, then only a portion of that partial ATM cell will be included the current frame.

If there is enough space in the data payload for the entire partial ATM cell, then the partial ATM cell will consume a multiple of the value of SIZE. By way of example, the partial ATM cell may consume four times the value of SIZE, when the value of SIZE is greater than 0. However, the actual size of the partial cell or packet may be up to three octets less than the result of the expression, 4*SIZE, in which case the extra octets may be filled with zeroes.

The reason for the potential discrepancy between the actual size of a partial ATM cell or packet and the space which is reserved for the same stems from the fact that the variable SIZE reflects merely a portion of the space within a frame which is reserved for the partial cell or packet. Because the variable SIZE is expressed as a whole number, when it is multiplied by a predetermined number, such as four, in order to determine the total space within a frame which is reserved for the partial cell or packet, the result may be larger than the actual size of the corresponding partial cell or packet.

Consider the following example. If the size of the data payload is 30 octets and there are 21 octets of a partial ATM cell or packet, then the partial ATM cell or packet will be inserted in the beginning of the frame payload along with 3 octets of zeroes which is merely padding. In this case the value of SIZE will be 6.

If the size of the data payload is again 30 octets and there are 40 octets of a partial ATM cell or packet to be included in the data payload, then only 30 octets of the partial ATM cell or packet will be inserted in the frame payload field. In this case, the value of SIZE will be 8, and the remaining 10 octets of the packet will be inserted in the next frame.

After the initial partial cell or packet segment has been included in the data payload, the data payload will be provided with a number of complete ATM cells equal to the value of COUNT with one exception. If the last complete ATM cell cannot be entirely contained in the data payload of the current frame, then only a portion thereof will be included in the data payload of the current frame. The remainder of the ATM cell will be included in the data payload of the next frame provided that there is enough space to accommodate the remainder.

After the complete ATM cells are included in the data payload, a number of variable-size packets may be provided therein. Each packet contains a length field which is 1-octet in length followed by the packet's contents. The value contained in the length field includes the length of the length field itself. For example, a packet having a length of 61 octets will begin with a length field of 62. If the last packet cannot be entirely contained in the data payload, then only its initial portion will be included therein. According to the present invention, the length field of a partial packet specifies the length of the entire packet.

If there are any octets left over in the data payload, then the first such unused octet shall contain a zero. The remainder of the octets, if any, shall be filled sequentially with the numbers i, i+1, i+2, . . . , where i is the octet number of the first such octet in the payload (octets in the payload are implicitly numbered 0,1, . . . ).

Based on the above mentioned rules, it is possible for the data payload of a frame to contain ATM cells only, packets only, or a combination of both. In addition, an ATM cell or packet may be split across more than two frames if either is larger than the size of the data payload. Moreover, the data payload size is unrelated to the size of an ATM cell or variable size packet. By way of example, the size of the data payload can be as small as two bytes.

The above-described frame structure allows for the possibility of dynamically changing the Reed-Solomon code size by correspondingly changing the data payload size but keeping the frame size constant. Such a scheme enhances the efficient use of the available transmission bandwidth Advantageously, if a receiving interface "loses" a frame, due to, for example, excessive bit errors in the frame, the variable SIZE can be used to rapidly determine an ATM cell or packet boundary in the very next frame.

Figure 3:
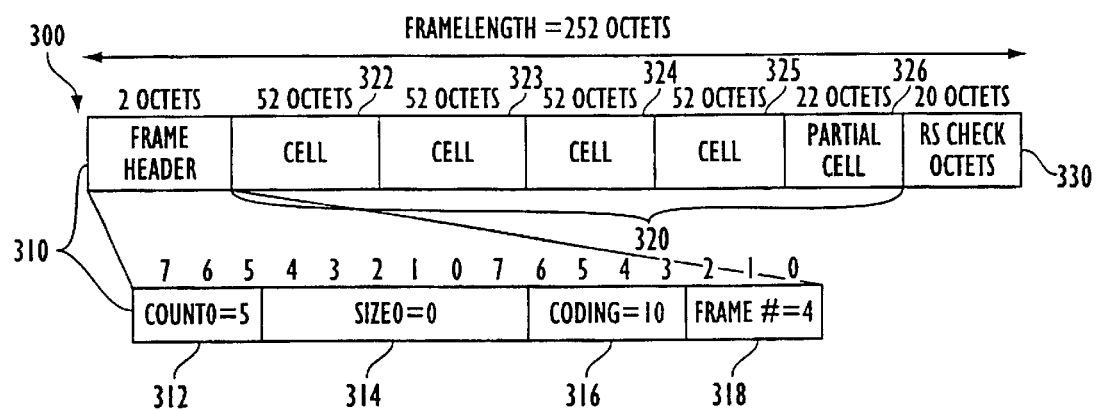
FIG. 3 shows a first example of a frame formed in accordance with the present invention.
Figure 4:
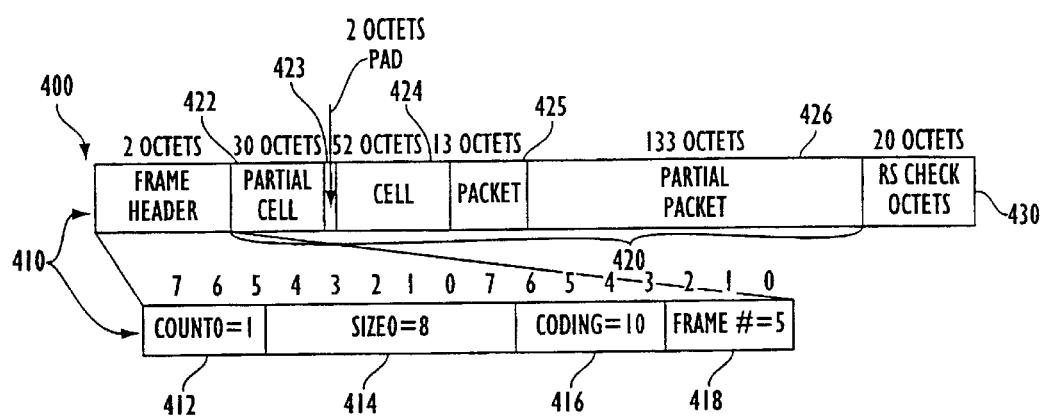
FIG. 4 shows a second example of a frame formed in accordance with the present invention.
Figure 5:
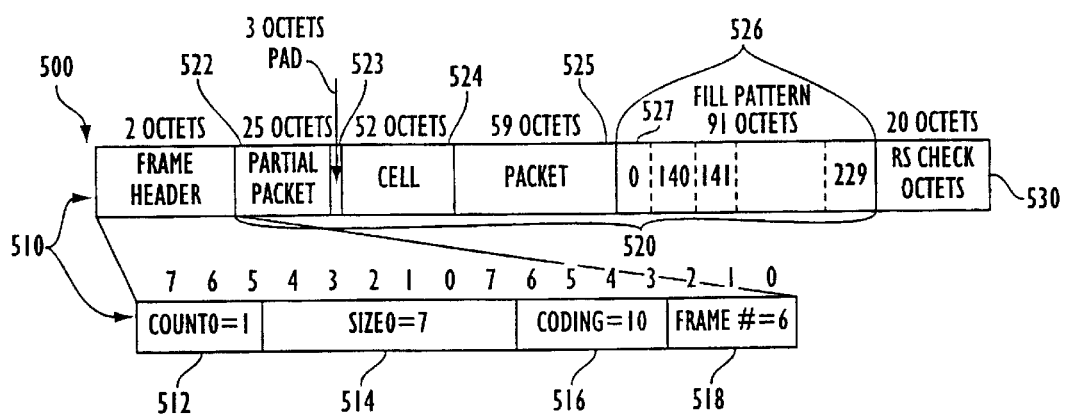
FIG. 5 shows a third example of a frame formed in accordance with the present invention.

FIGS. 3-5 show examples of frames which are organized according to the frame format of the present invention. Each frame has a fixed length of 252 octets. In addition, the contents of each frame is also shown in FIGS. 3-5. Although ATM cells contain 53 octets, as noted above, FIGS. 3-5 show each cell containing only 52 octets. The reason for this discrepancy stems from the fact that when a cell is received by an interface, one octet of the 5 octet header associated with that cell is removed to detect errors within the header. The removal of the octet occurs prior to the assembling of each frame of a communication signal. In addition, each packet includes a packet length field in their first octet which is not shown in FIGS. 3-5, as discussed above.

FIG. 3 shows a frame 300 formed in accordance with the present invention which includes a frame header 310, a data payload 320 and a block code 330. The frame header 310 includes a first field 312 which contains a variable COUNT having a value of 5, and a second field 314 which contains a variable SIZE having a value of 0. The frame header 310 also includes a third field 316 which contains a variable CODING having a value of 10, and a fourth field 318 which contains a variable FRAMENUM having a value of 4.

Given that the value of the variable COUNT is 5, there are 5 ATM cells 322–326 included within the data payload 320. Because the value of the variable SIZE is 0, the data payload 320 does not contain a partial ATM cell which precedes the 5 ATM cells 322–325 included therein. Accordingly, there are at least 4 complete ATM cells contained in the data payload 320. In addition, because the frame header 310 occupies 2 octets and the block code 330 occupies octets, as determined by the value of the variable CODING, (which in this 20 case is 10) it is clear that a partial ATM cell 326 must also be included in the data payload 320.

The reason for this stems from the fact that there are 22 octets used for the frame header 310 and the block code 330, alone, leaving 230 octets for the data payload 320. With four complete ATM cells 322–325 occupying the data payload 320, at 52 octets a piece, only 22 octets are left in the data payload 320 for the remaining ATM cell. Therefore, only a partial ATM cell 326 can be included in the current frame 300. The remaining 30 octets must be included in the next frame, as shown in FIG. 4.

FIG. 4 shows a frame 400 formed in accordance with the present invention which includes a frame header 410, a data payload 420 and a block code 430. The frame header 410 includes a first field 412 which contains a variable COUNT having a value of 1, and a second field 414 which contains a variable SIZE having a value of 8. The frame header 410 also includes a third field 416 which contains a variable CODING having a value of 10, and a fourth field 418 which contains a variable FRAMENUM having a value of 5.

Because the variable SIZE has a value of 8, there are 32 octets which have been reserved for the initial partial cell 422 in the data payload 420. As the initial partial cell 422 only requires 30 octets, 2 additional octets of padding 423 are included in the data payload 420. With 22 octets being used for the frame header 410 and the block code 430 and 32 octets being used for the initial partial ATM cell, there are still 198 octets remaining in the data payload 420 of the frame 400. As the value of COUNT is 1, there is at least one complete ATM cell 424 included in the data payload 420 of the frame 400.

The remaining 198 octets of the data payload 420 are occupied by a complete packet 425 and a partial packet 426. The complete packet 425 occupies 13 octets of the data payload, while the partial packet 426 occupies the remaining 133 octets of the fifth frame's data payload. The next frame shown in FIG. 5, includes the remainder of the second packet which includes the partial packet 426.

FIG. 5 shows a frame 500 formed in accordance with the present invention which includes a frame header 510, a data payload 520 and a block code 530. The frame header 510 includes a first field 512 which contains a variable COUNT having a value of 1, and a second field 514 which contains a variable SIZE having a value of 7. The frame header 510 also includes a third field 516 which contains a variable CODING having a value of 10, and a fourth field 518 which contains a variable FRAMENUM having a value of 6.

As the value of SIZE is 7, there are 28 octets reserved for a partial packet 522 which along with the partial packet 426 (shown in FIG. 4) comprises the second packet shown in FIG. 4. However, because the partial packet 522 only occupies 25 octets, three octets of padding 523 are included in the data payload 520 of the sixth frame. Because the value of COUNT is one, there is an ATM cell 524 included in the sixth frame. This ATM cell 524 is also a complete ATM cell because only 50 octets of the frame 500 are employed for the frame header 510, block code 530 and the remainder of the second packet.

There is one 59 octet packet 525 which also occupies the data payload 520 of the sixth frame, leaving 91 octets remaining. According to the present invention the remaining 91 octets are used for the synchronization pattern 526 described above. However, the first octet 527 of the left over portion of the data payload 520 has a value of zero to delineate between the end of the packet and the beginning of the synchronization pattern 526. Each byte position of the remainder of the left over portion of the data payload 520 stores a number which corresponds to the byte position.

As shown in FIG. 5, the first byte position of the synchronization pattern, which corresponds to the one-hundred and fortieth byte position of the data payload, stores a value of zero. The second byte position of the synchronization pattern, which corresponds to the one hundred and forty-first byte position of the data payload, stores a value of 140. The third byte position of the synchronization pattern, which corresponds to the one hundred and forty-second byte position of the data payload, stores a value of 141.

The value stored in each subsequent byte position of the data payload increases sequentially up to and including the last or two hundred and thirtieth byte position of the data payload. Therefore, the two hundred and thirtieth byte position of the data payload would store a value of 229.

The reason for the discrepancy between the byte position number and the value stored therein, stems from the fact that the first byte position would store a value of zero if there were no partial or complete ATM cells or packets included in the data payload while the value stored in the two hundred and thirtieth position would be 229.

As noted above, if there are no partial or complete ATM cells or packets included in a particular cell, then the data payload can be filled entirely with the synchronization pattern. The advantage of using the synchronization pattern of the present invention stems from the fact that it is very easy to determine where the boundary of a particular frame lies for frame synchronization once the value stored at a particular byte position is ascertained.

As noted above, the present invention also encompasses an interleaving scheme. This scheme is used to correct long error bursts by spreading error bursts across multiple frames so that the block coding which is employed for error correction can provide error free frames with greater frequency.

The present invention also encompasses a "convolutional" interleaving scheme which provides better delay performance, as compared to alternate interleaving schemes.

Figure 6:
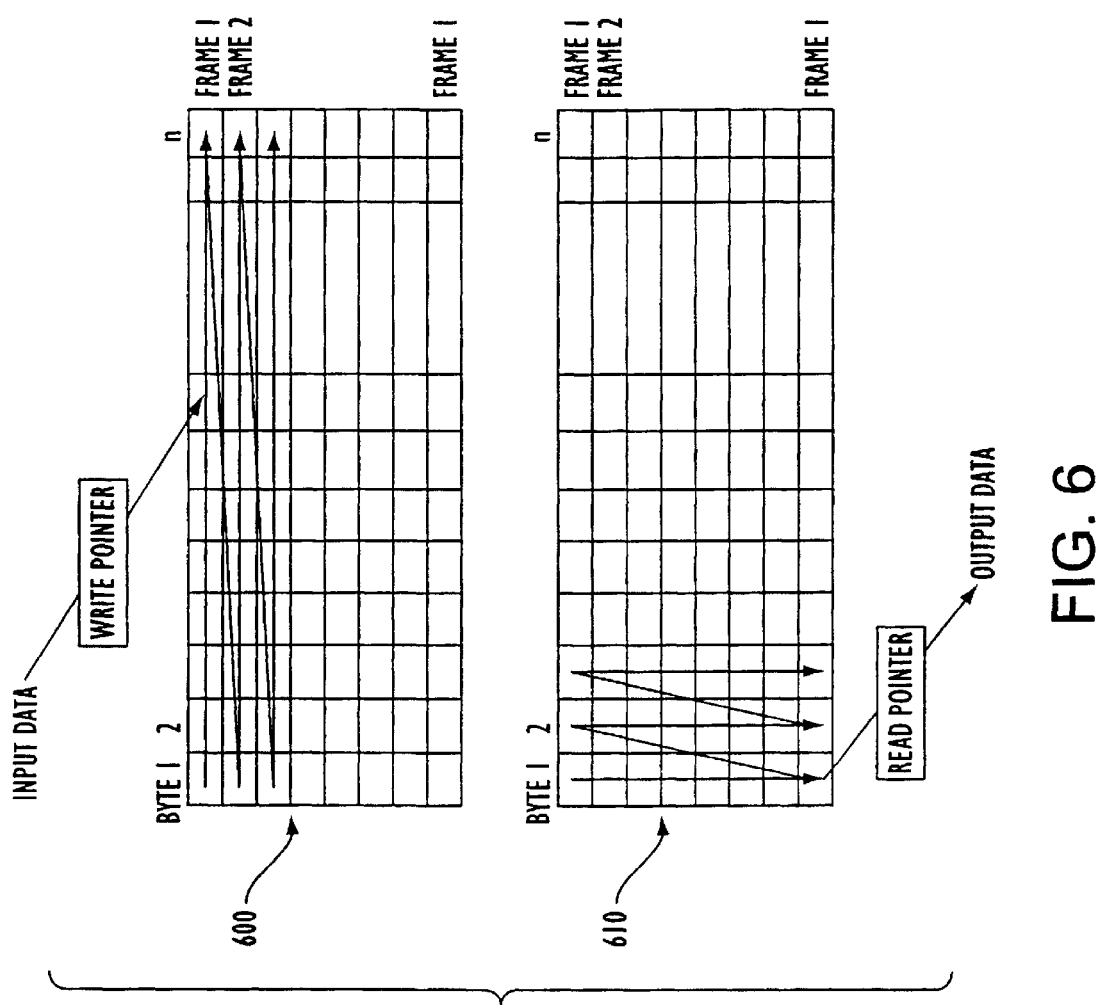
FIG. 6 shows two buffers which are used to implement a first interleaving scheme of the present invention.

According to the present invention, interleaving may be accomplished in the manner shown in FIG. 6, in which two memory buffers 600 and 610 store a group of individual frames which are used to produce an interleaved frame for transmission to a receiving interface. At any given time, a group of individual frames I are collected into the buffer 600 while data from the other buffer 610 is being transmitted. However, the buffer roles are exchanged at the end of each transmission.

At the transmitting interface, the bytes of I frames are written into the buffer 600 in "row" order, as shown in FIG. 6, while the bytes stored in the other buffer 610 are read out in "column" order. The receiving interface has a similar arrangement of dual buffers (not shown). However, the process is reversed in the receiving interface. Specifically, bytes of the received frames are written into one buffer (not shown) in "column" order, while bytes of the other buffer (not shown) are read in "row" order.

The net effect of the interleaving scheme is that a burst of errors, which affects a communication signal as it propagates over a transmission link, is spread across multiple frames. For example, if there are eight frames included within an interleaved frame, then an error burst of 80 octets will affect only 10 octets in each frame. Advantageously, the block code (e.g. Reed-Solomon coding) of each frame is capable of correcting the 10 octets of the frame containing errors. As a result, all of the octets including errors can be corrected.

Without the aforementioned interleaving scheme, the error burst would affect all 80 octets included within a single frame (or perhaps spread across 2 frames). Therefore, many octets with errors would be beyond the capability of the block code to correct. This is also the case with a Reed-Solomon error-correcting algorithm.

One of the disadvantages of the aforementioned interleaving scheme is that each byte experiences an end-to-end transmission delay equivalent to the transmission time of 2*I frames, with I being the number of individual frames included in an interleaved frame. In addition, the above-mentioned interleaving scheme is both costly and complex because dual buffers are used to perform the interleaving operation.

In accordance with the present invention, a second interleaving scheme may be employed which has the same properties of error-spreading as the first interleaving scheme. However, the second interleaving scheme merely requires a single buffer to implement. In addition, the second interleaving scheme reduces by half the end-to-end delay experienced by each byte.

Figure 7:
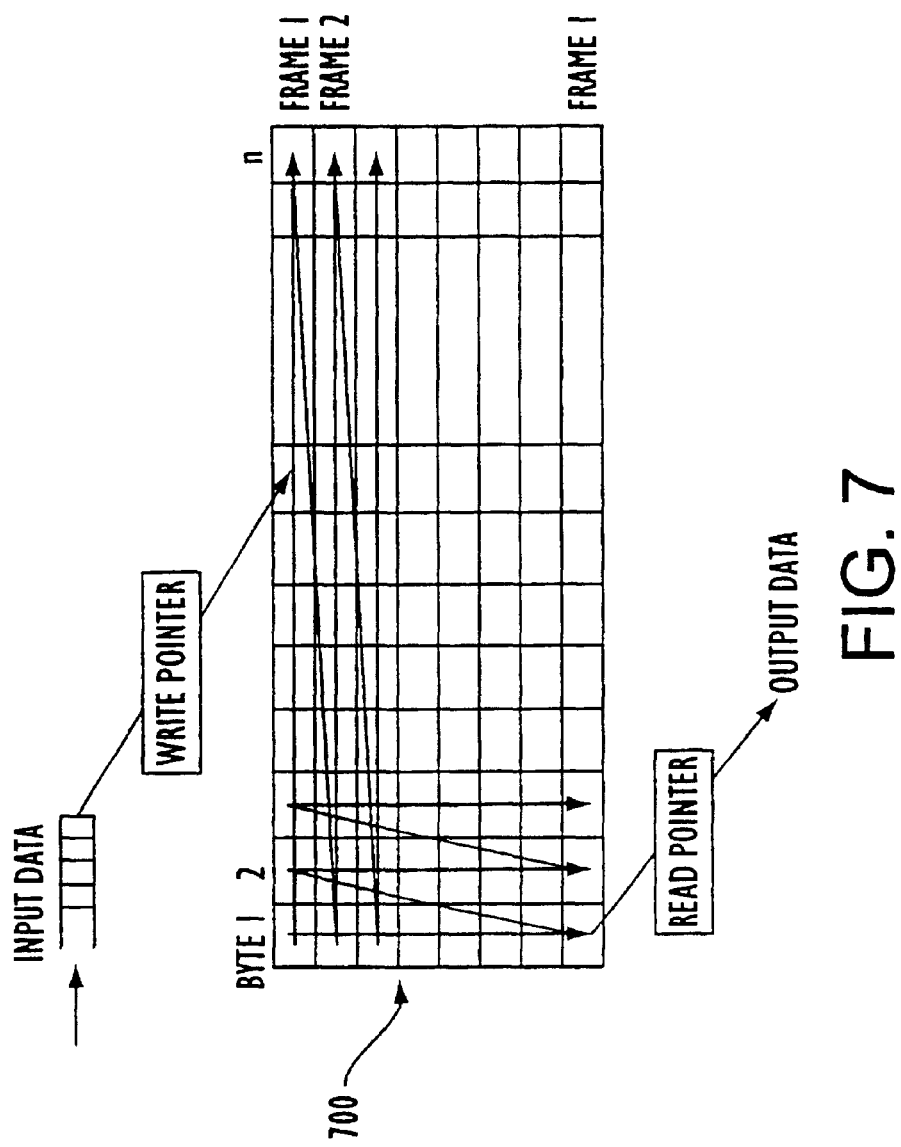
FIG. 7 shows a single buffer which is used to implement a second interleaving scheme of the present invention.

FIG. 7 shows a single buffer 700 which is capable of storing I frames in order to produce of an interleaved frame. The buffer 700 is used to implement the second interleaving scheme of the present invention, by which data is written and read from the buffer 700 one byte at a time in an alternating fashion. In particular, data is written in "row" order and read in "column" order.

A first-in/first-out (FIFO) buffer (not shown) may be provided to facilitate the writing of data, if the arrival of the data is not synchronous with the transmission link rate.

Initially, the read and write pointers are both initialized to point to the first byte of the first frame. The interleaving operation then completes a read operation, followed by a write operation. The interleaving operation continues in an alternating fashion thereafter.

A similar operation is employed when deinterleaving an interleaved frame at the receiving interface, with the output of the transmitting interface being exactly the same as the input of the receiving interface. However, the deinterleaving operation begins by performing a write operation, which is then followed by a read operation. This is continued in an alternating fashion. In other words, the data received over the link is first written to a buffer (not shown) in "column" order and then read out in "row" order. When the deinterleaving operation is performed, a burst error of H octets will affect only a number of octets of I different frames equal to H/I.

Regarding the delay which is experienced by the transmitted data, it can be shown that different bytes of data experience different delays during the interleaving and deinterleaving operations. However, the sum of the two delays for any byte is always equal to the total transmission time T of each of I individual frames. That is, the end-to-end delay time is half that which is incurred by employing the first interleaving scheme (e.g. one half of the frame transmission time of 2*I frames).

An example of the second interleaving scheme is described below in connection with a small interleaved frame (shown in Table 1) which is interleaved to a depth of three frames, with each frame containing three bytes.

TABLE 1

| FRAME | BYTE NUMBER | | |
|---|---|---|---|
| | 1 | 2 | 3 |
| A | A1 | A2 | A3 |
| B | B1 | B2 | B3 |
| C | C1 | C2 | C3 |

Table 2 below shows the progression of data according to the second interleaving scheme. In particular, Table 2 shows the progression of data into and out of a first buffer (included in a transmitting interface), which is employed in the interleaving operation. Table 2 also shows the progression of the data into and out of a second buffer (included in a receiving interface), which is employed in the deinterleaving operation of the present invention. As noted above, by using a single buffer for each of the interleaving and deinterleaving operations, a substantial reduction in the delay experienced by the transmitted data can be achieved.

TABLE 2

| | Interleave | | Deinterleave | |
|---|---|---|---|---|
| BYTE TIME | READ (Column) | Write (Row) | Write (Column) | Read (Row) |
| 1 | A1 = 0 | A1 = DATA-1 | A1 = 0 | A1 = 0A2 = 0 |
| 2 | B1 = 0 | A2 = DATA-2 | B1 = 0 | A3 = 0 |
| 3 | C1 = 0 | A3 = DATA-3 | C1 = 0 | B1 = 0 |
| 4 | A2 = DATA-2 | B1 = DATA-4 | A2 = DATA-2 | B2 = 0 |
| 5 | B2 = 0 | B2 = DATA-5 | B2 = 0 | B3 = 0 |
| 6 | C2 = 0 | B3 = DATA-6 | C2 = 0 | C1 = 0 |
| 7 | A3 = DATA-3 | C1 = DATA-7 | A3 = DATA-3 | C2 = 0 |
| 8 | B3 = DATA-6 | C2 = DATA-8 | B3 = DATA-6 | C3 = 0 |
| 9 | C3 = 0 | C3 = DATA-9 | C3 = 0 | A1 = DATA-1 |
| 10 | A1 = DATA-1 | A1 = DATA-10 | A1 = DATA-1 | A2 = DATA-2 |
| 11 | B1 = DATA-4 | A2 = DATA-11 | B1 = DATA-4 | A3 = DATA-3 |
| 12 | C1 = DATA-7 | A3 = DATA-12 | C1 = DATA-7 | B1 = DATA-4 |
| 13 | A2 = DATA-11 | B1 = DATA-13 | A2 = DATA-11 | B2 = DATA-5 |
| 14 | B2 = DATA-5 | B2 = DATA-14 | B2 = DATA-5 | B3 = DATA-6 |
| 15 | C2 = DATA-8 | B3 = DATA-15 | C2 = DATA-8 | C1 = DATA-7 |
| 16 | A3 = DATA-12 | C1 = DATA-16 | A3 = DATA-12 | C2 = DATA-8 |
| 17 | B3 = DATA-15 | C2 = DATA-17 | B3 = DATA-15 | C3 = DATA-9 |
| 18 | C3 = DATA-9 | C3 = DATA-18 | C3 = DATA-9 | |

Prior to the first byte time cycle (BYTE TIME 1) of the interleaving operation, the contents of the buffer in the transmitting interface and the buffer in receiving interface are initialized to zero and the pointers for the read and write functions in both buffers are pointed to the first byte position of frame A (i.e. A1).

During the read phase of the first byte time cycle of the interleaving operation, a READ operation is initially performed. Next, a WRITE operation is carried out during the write phase of the first byte cycle so that the byte DATA-1 is written into the first byte position A1 of the first frame A (i.e. A1=DATA-1).

This process continues for the second and third byte time cycles. Hover, during the read phase of the second and third byte time cycles, only zeros are read from the buffer because each byte of the buffer was initialized to zero. During the write phase of the second byte time cycle, the byte DATA-2 is written into the second byte position A2 of the first frame. Similarly, during the written phase of the third byte time cycle, the byte DATA-3 is written into the third byte position A3 of the first frame A.

During the read phase of the fourth byte time cycle, the READ pointer has advanced to the second byte position A2 of the first frame A where the byte DATA-2 is stored. During the write phase of the fourth byte time cycle, the WRITE pointer has advanced to the first byte position B1 of the second frame B where DATA-5 will be written.

The process of reading in columns and writing in rows produces the results shown in Table 2 for the first through ninth byte time cycles. During this first buffer cycle a first pass through the buffer corresponding to the interleaving operation is completed. At the conclusion of the first buffer cycle, nine bytes DATA-1 through DATA-9 have been written into the buffer corresponding to the interleaving process, while only three bytes, DATA-2, DATA-3 and DATA-6 have been read out of that buffer.

That which is read during the interleaving operation, as shown in the Interleave READ Column of TABLE 2, is ultimately transmitted to the receiving interface where the deinterleaving operation is performed. During the deinterleaving operation, the bytes which are received from the transmitting interface are written into the buffer corresponding to the deinterleaving operation, as shown in the Deinterleave WRITE Column of TABLE 2.

The results of the deinterleaving operation for the first buffer cycle shows the same three data bytes which were read into buffer corresponding to the interleaving operation being written into the buffer corresponding to the deinterleaving operation. However, during the first buffer cycle, none of the bytes, DATA-1 through DATA-9, appear at the output of the buffer corresponding to the deinterleaving operation. The reason is that none of the bytes, DATA-1 through DATA-9, are written into a predetermined portion of the buffer corresponding to the deinterleaving operation prior to the contents of that portion being read (the Deinterleaver Read Row contains all zeroes).

During the second buffer cycle, the bytes, DATA-10 through DATA-8, are written into the buffer corresponding to the interleaving operation, while the bytes, DATA-1 through DATA-9, are being read from the buffer corresponding to the deinterleaving function. Significantly, all of the data bytes that were written into the buffer corresponding to the interleaving function during the first buffer cycle were read out of the deinterleave buffer in the proper order in the second buffer cycle.

The delay that each byte experiences in each buffer varies, but the sum is always equal to the frame duration, in byte time cycles, times the depth of the interleaved. In the above example, the frame duration is 3 byte time cycles and depth of interleaved frame is three individual frames, for a total delay of 9 byte time cycles.

Consider an individual byte, such as DATA-1. According to TABLE 2, the byte, DATA-1, was held in the buffer corresponding to the interleaving operation for 9 byte time cycles and for 0 byte times (WRITTEN and READ in the same byte cycle) in the buffer corresponding to the deinterleaving operation. Similarly, the byte, DATA-2, was held in the buffer corresponding to the interleaving operation for 2 byte time cycles and in the buffer corresponding to the deinterleaving operation for 7 byte time cycles for a total of nine byte time cycles.

The interleaving schemes of the present invention may be implemented as a computer algorithm and run on a computer processor.

Figure 8A:
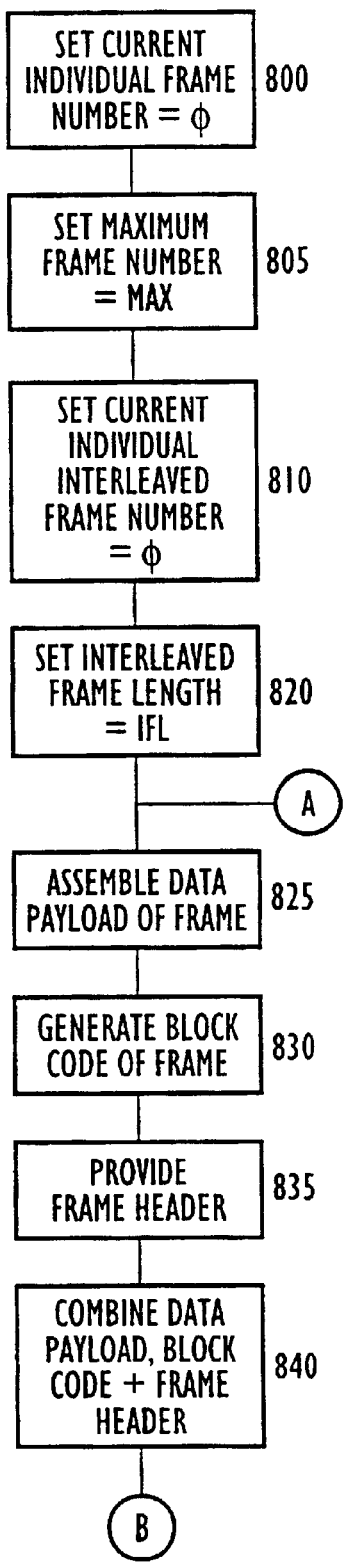
FIGS. 8A–8C show flow charts incorporating methods of assembling frames according to the present invention.

An exemplary method of assembling frames according to the present invention is described below in connection with the flow chart depicted in FIGS. 8A and 8B. Each frame is structured in the manner described above.

Initially, in step 800, the variable, CURRENT INDIVIDUAL FRAME NUMBER, is set equal to zero. In step 805, the variable, MAXIMUM FRAME NUMBER, is set equal to a predetermined value, MAX.

In step 810, the variable, CURRENT INDIVIDUAL INTERLEAVED FRAME NUMBER, is set equal to zero. In step 820, the variable, INTERLEAVED FRAME LENGTH, is set equal to a predetermined value, IFL, which represents the number of individual frames in an interleaved frame.

Thereafter, in step 825, the data payload of a current individual frame having the CURRENT INDIVIDUAL FRAME NUMBER is assembled. In step 830, the block code of the current frame is generated. In step 835, a frame header is provided for the current frame. The data payload, block code and format header are then combined to form a frame in step 840.

If the current individual frame is being included within an interleaved frame, as determined in step 845, then the current individual frame is assigned a corresponding CURRENT INDIVIDUAL INTERLEAVED FRAME NUMBER in step 847. Subsequently, the current individual frame is stored in step 850. Thereafter, it is determined in step 855 whether the CURRENT INDIVIDUAL INTERLEAVED FRAME NUMBER of the current individual frame is equal to IFL, which is the INTERLEAVED FRAME LENGTH.

If the CURRENT INTERLEAVED FRAME NUMBER is not equal to IFL, then the CURRENT INDIVIDUAL INTERLEAVED FRAME NUMBER is incremented in step 860.

If the CURRENT INDIVIDUAL INTERLEAVED FRAME NUMBER corresponding to the current individual frame is equal to IFL, then in step 865, each of the IFL stored frames (numbering IFL) are interleaved in the manner discussed above. In step 870, the interleaved frame is transmitted, while the CURRENT INDIVIDUAL INTERLEAVED FRAME NUMBER is set to zero in step 875.

If the current individual frame is not to be included in an interleaved frame, as determined in step 845, then the current individual frame is transmitted in step 880.

In step 885, which follows, either of steps 860, 875 and 880, it is determined whether the CURRENT INDIVIDUAL FRAME NUMBER is equal to MAX. If the CURRENT INDIVIDUAL FRAME NUMBER is not equal to MAX, then the CURRENT INDIVIDUAL FRAME NUMBER is incremented in step 890. However, if the CURRENT INDIVIDUAL FRAME NUMBER is equal to MAX, then the CURRENT INDIVIDUAL FRAME NUMBER is set equal to zero in step 895. Following either of steps 890 and 895, step 825 is performed for the next frame.

Figure 8B:
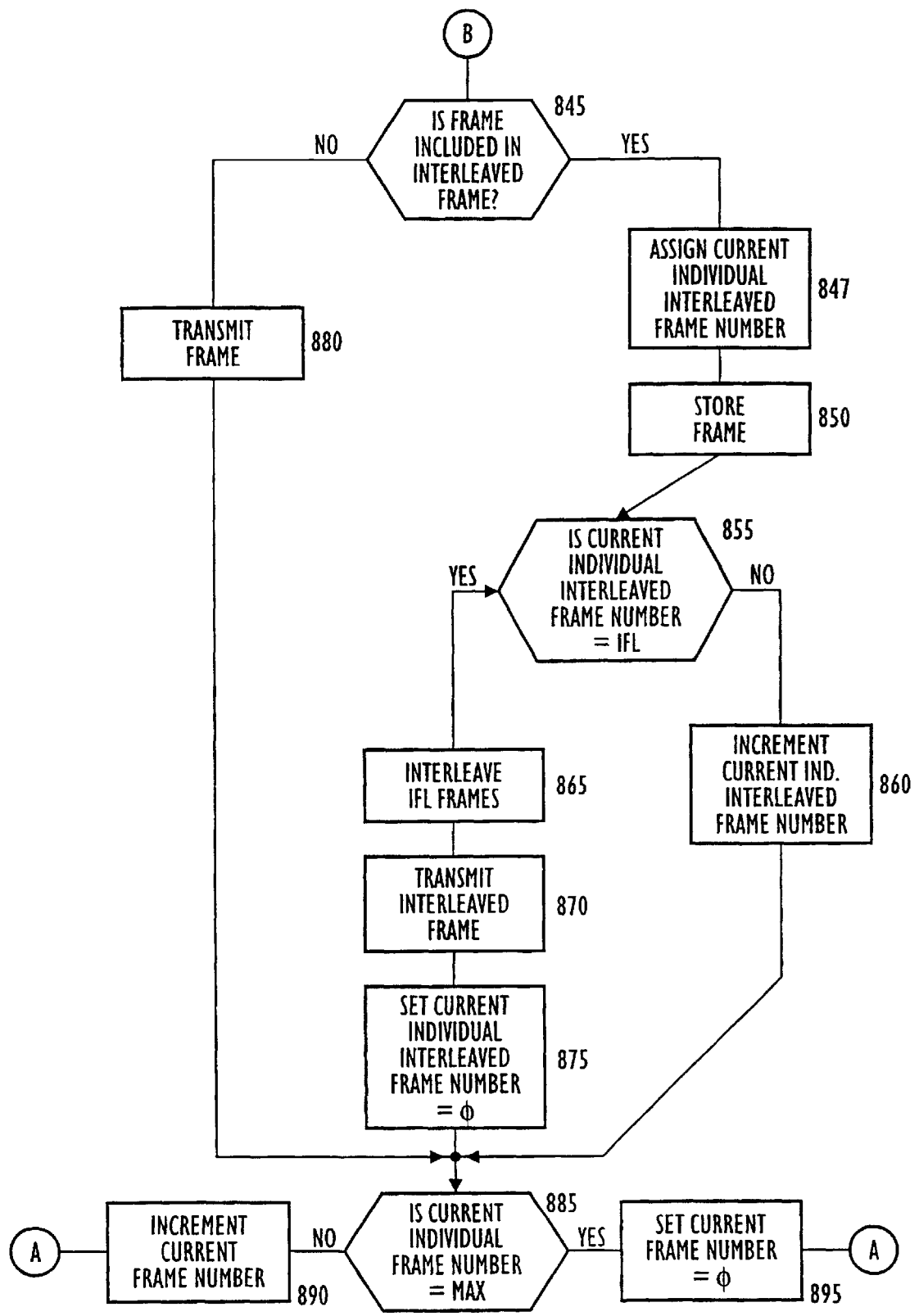
Figure 8C:
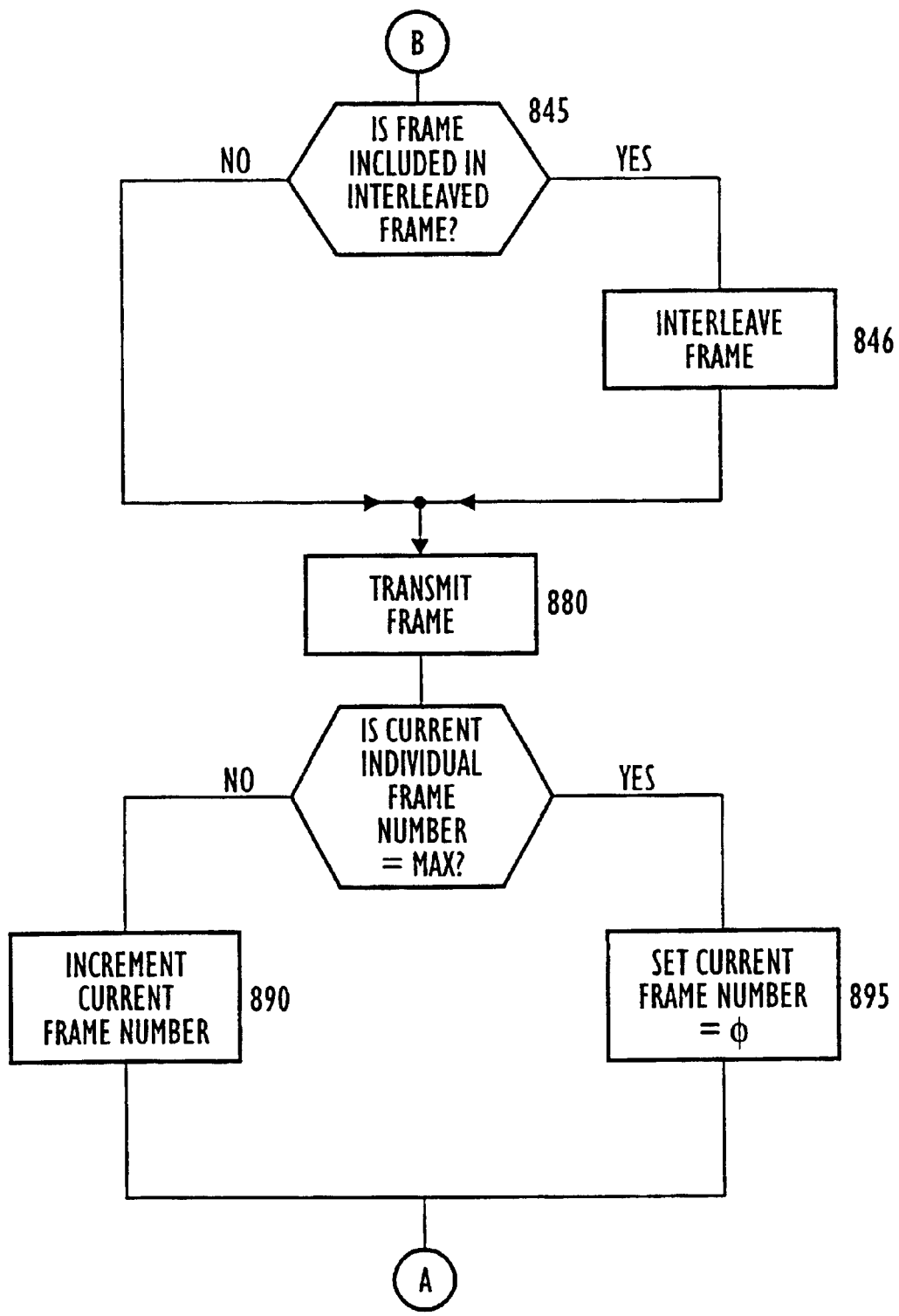

FIG. 8C shows a modification of the flow chart shown in FIG. 8B, which depicts another aspect of the inventive method of assembling frames. In particular, the flow chart is applicable in the case where "convolutional" interleaving is employed. Steps 845, 880, 885, 890 and 895 are similar to those shown in FIG. 8B. Accordingly, no additional description of those steps are provided.

If it is determined in step 845 that the current individual frame is included in an interleaved frame, then in step 846 the current individual frame is interleaved in the manner described above in connection with the "convolutional" interleaving operation of the present invention. Subsequently, the current individual frame is transmitted in step 880.

If it is determined in step 845 that the current individual frame is not included in an interleaved frame then the current individual frame is transmitted in step 880. The flow chart of FIG. 8C is simpler than the flow chart of FIG. 8B, because all of the individual frames which are included in an interleaved frame need not be stored prior to the transmission of the interleaved frame.

Figure 9A:
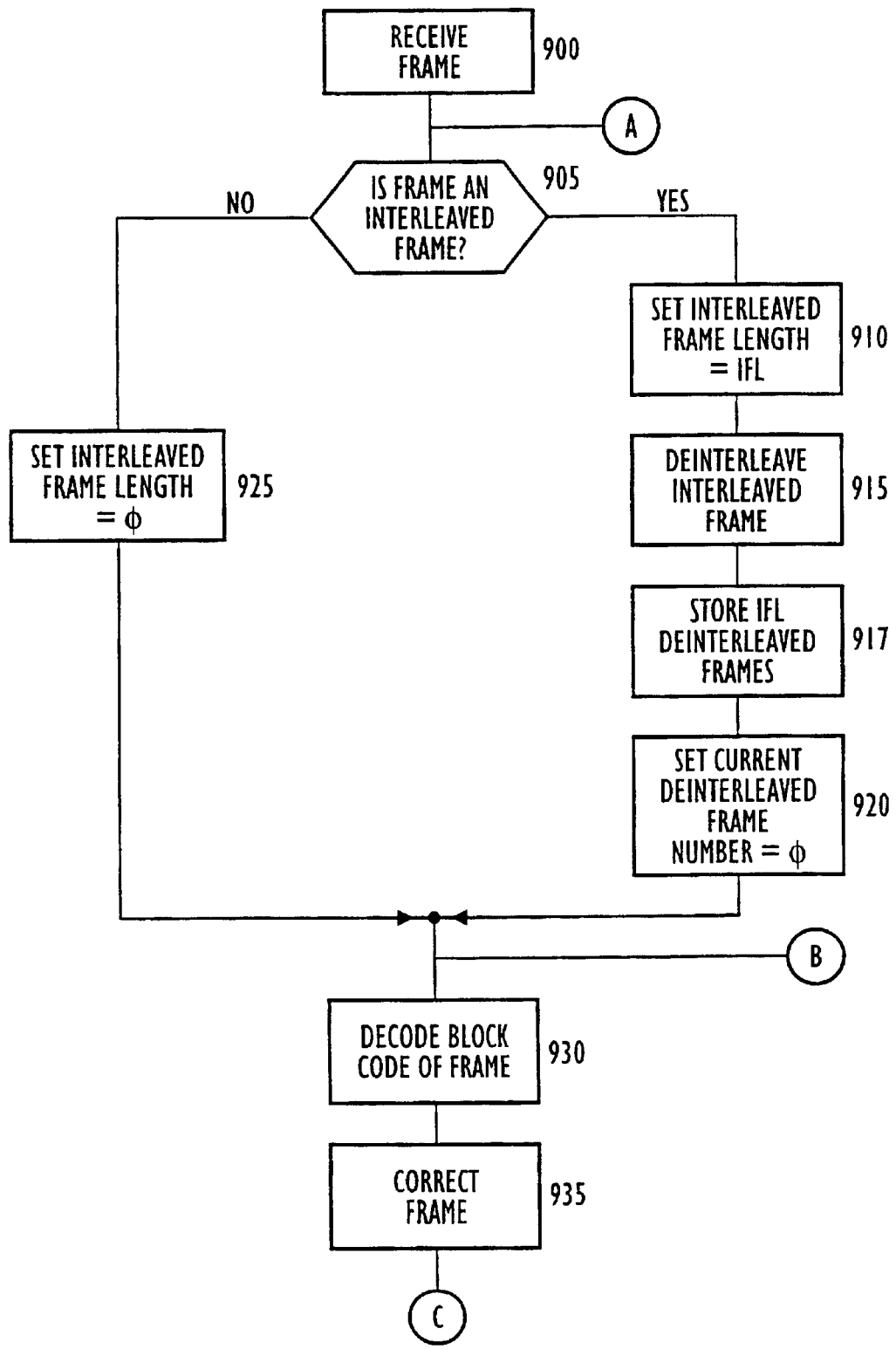
FIGS. 9A–9C show flow charts incorporating methods of assembling frames according to the present invention.
Figure 9B:
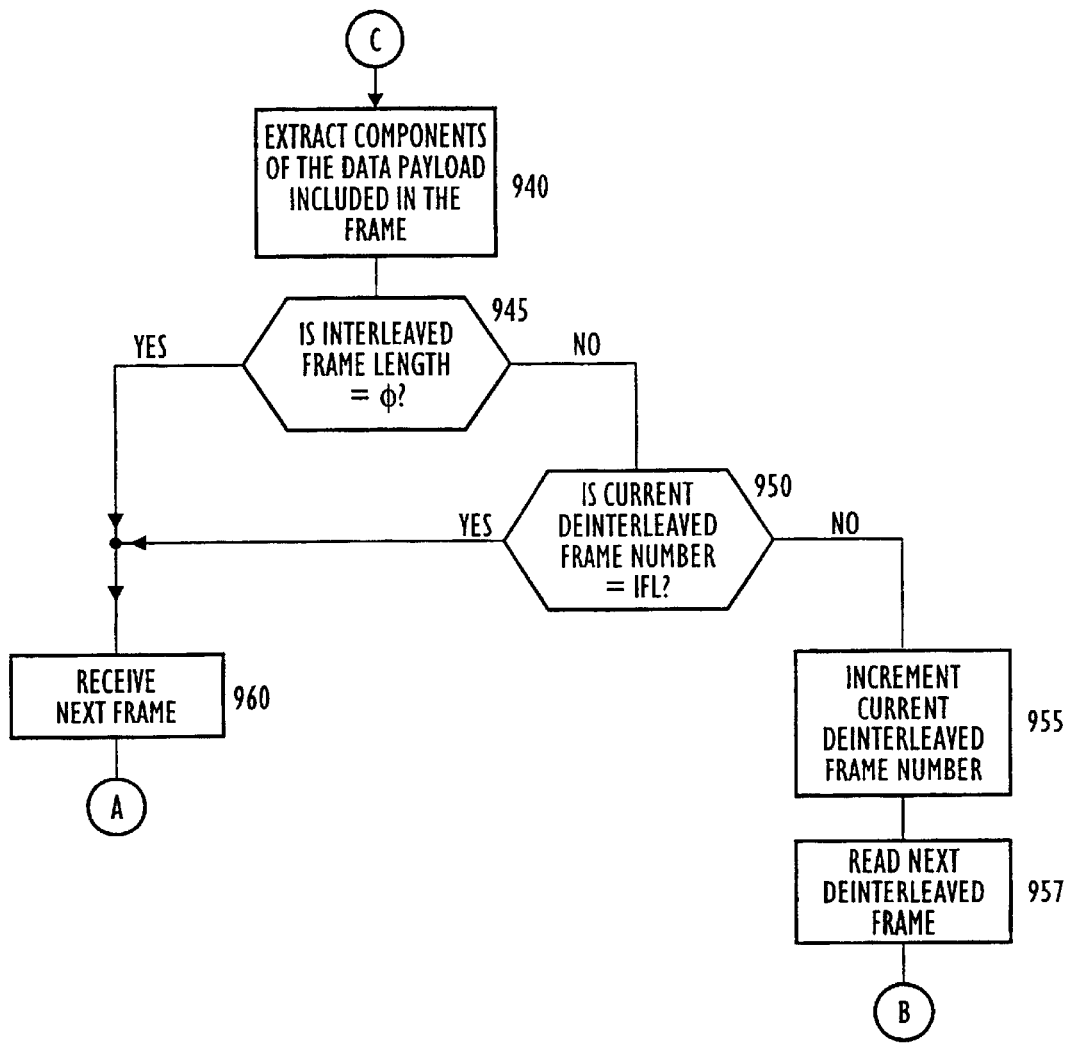

A method of disassembling frames according to the present invention is described below in connection with the flow chart depicted in FIGS. 9A and 9B.

A frame is received in step 900. Subsequently, it is determined in step 905 whether the received frame is an interleaved frame. If the received frame is an interleaved frame, then the variable, INTERLEAVED FRAME LENGTH, which represents the length of the interleaved frame in individual frames, is set equal to a predetermined value, IFL, in step 910. Subsequently, the interleaved frame is deinterleaved in step 915 in order to provide individual frames which are stored in step 917 (in a buffer, for example). The variable, CURRENT DEINTERLEAVED FRAME NUMBER, is then set equal to zero in step 920.

If the received frame is not an interleaved frame, as determined in step 905, then the variable, INTERLEAVED FRAME LENGTH, is set equal to zero in step 925.

In step 930, the block code of the current individual frame, which may have been part of an interleaved frame, is decoded based on information included in the frame header of the current individual frame. Thereafter, the current individual frame is corrected based on information contained in the block code in step 935. In step 940, components of the data payload (e.g. partial or complete ATM cells or packets) are extracted from the frame based on information contained in the frame header of the frame.

Thereafter, in step 945, it is determined whether the variable, INTERLEAVED FRAME LENGTH, has a value of zero. If the variable, INTERLEAVED FRAME LENGTH, does not have a value of zero, then the current individual frame is a deinterleaved individual frame. Accordingly, in step 950 it is determined whether the CURRENT DEINTERLEAVED FRAME NUMBER is equal to IFL. If it is determined that the CURRENT DEINTERLEAVED FRAME NUMBER is not equal to IFL then the value of the variable, CURRENT DEINTERLEAVED FRAME NUMBER, is incremented by one in step 955.

In step 957, the next deinterleaved frame corresponding to the CURRENT DEINTERLEAVED FRAME NUMBER is read (from the buffer for example). Thereafter, step 930 is performed for the next de-interleaved frame having the corresponding CURRENT DEINTERLEAVED FRAME NUMBER.

If the variable, INTERLEAVED FRAME LENGTH, has a value of zero or the variable, CURRENT DEINTERLEAVED FRAME NUMBER, has a value equal to IFL, then the next frame is received in step 960. Following step 960, step 905 is repeated for the next frame.

Figure 9C:
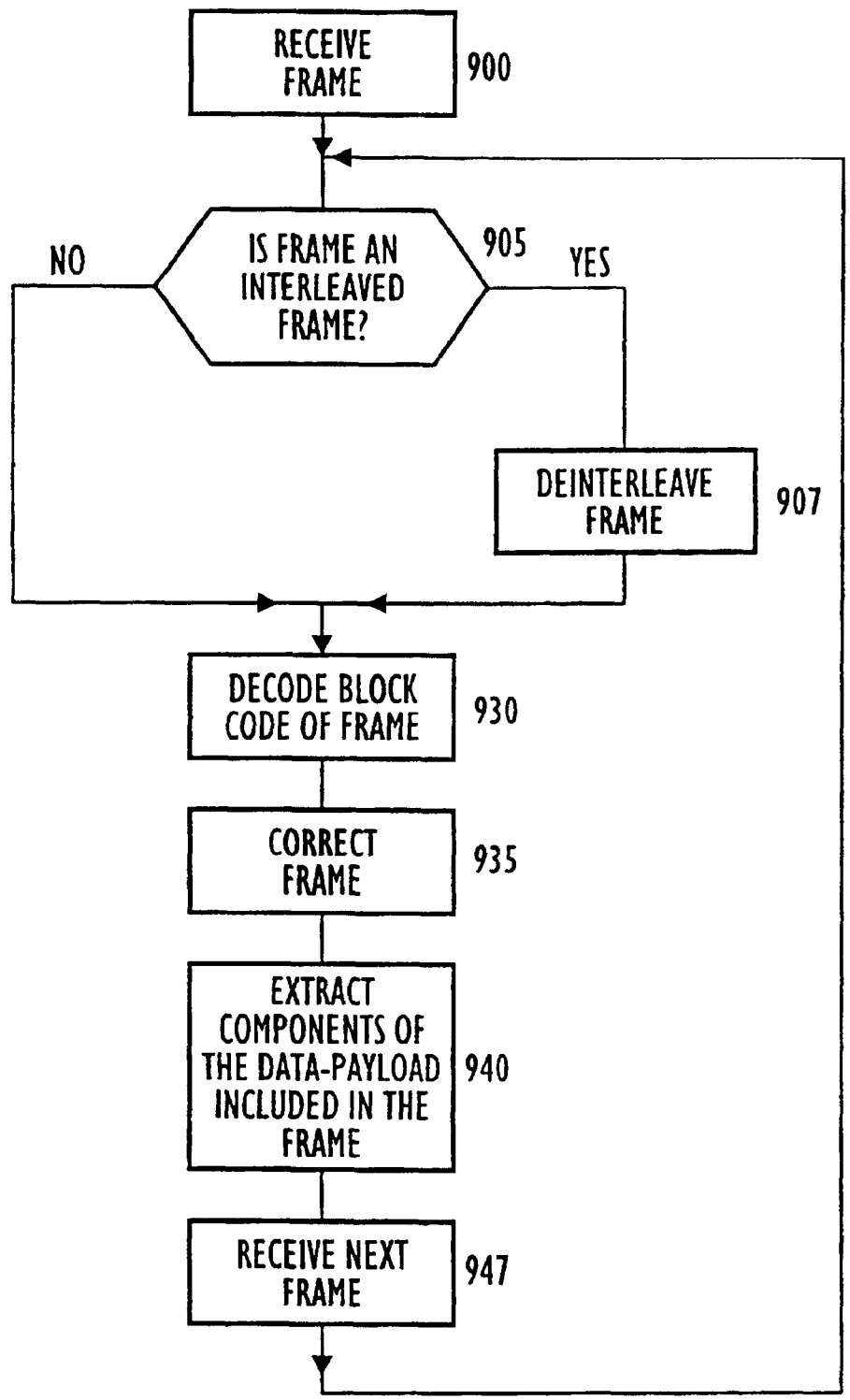

FIG. 9C depicts an alternative method of disassembling frames according to the present invention which incorporates "convolutional" deinterleaving. However, the method includes steps which are similar to those of the method described in connection with the flow chart depicted in FIGS. 9A and 9B. In particular, steps 900, 905, 930, 935 and 940, shown in FIG. 9C are similar to the corresponding steps shown in FIGS. 9A and 9B. Accordingly, there is no additional description provided for those steps.

In step 905, if it is determined that the received frame is an interleaved frame, then in step 907, the received frame is deinterleaved in the manner described above in connection with the "convolutional" deinterleaving operation of the present invention. Thereafter, step 930 is performed in the manner described above.

If it is determined that the received frame is not an interleaved frame, then step 930 is performed without the deinterleaving step 907.

Following step 940, the next frame is received in step 947. Thereafter, step 905 is performed in the manner described above.

Advantageously, the "convolutional" deinterleaving operation of the present invention does not require that the entire interleaved frame be stored prior to the transmission of the same.

Figure 10:
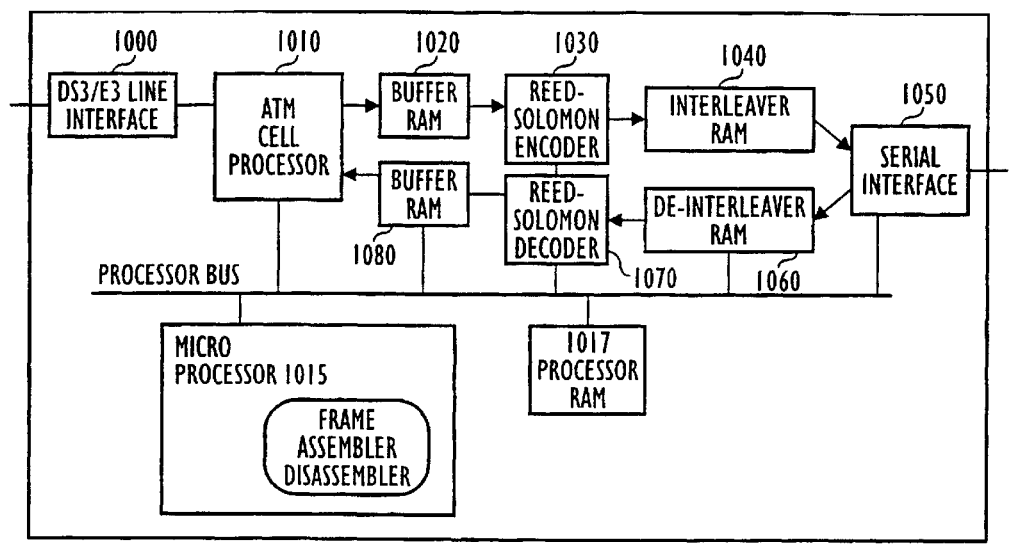
FIG. 10 shows an exemplary apparatus according to the present invention.

The architecture of an exemplary apparatus embodying the present invention is discussed below in connection with FIG. 10.

A DSE/E3 Line Interface 1000 receives input data including ATM cells from an ATM switch (not shown). However, another line interface may be used to accommodate alternative standards. The ATM cell processor 1010 receives the ATM cells from the interface 1000.

The ATM cell processor 1010 extracts a portion of any ATM cell received in order to determine whether errors are present within the header of the ATM cell. The ATM Cell Processor 1010 then outputs the remainder of any ATM cell (without its error correction portion) to a RAM Buffer 1020 under the control of a Microprocessor 1015 which is employed as the frame assembler of the present invention. A RAM 1017 is provided for the Microprocessor 1015.

The Microprocessor 1015 forms frames in the manner described above. However, the data payload of each frame is stored in the RAM Buffer 1020. In addition, the Microprocessor 1015 appends a frame header to the data payload of each frame. The data payload may also include packets of compressed ATM cells.

Subsequently, the frame header and the data payload of each frame are output from the RAM buffer 1020 to a Reed-Solomon Encoder 1030. The Reed-Solomon Encoder 1030 appends a number of check-bytes to each frame for error correction of the frame at a receiving apparatus.

An Interleaver RAM 1040 receives the output of the Reed-Solomon Encoder 1030 under the control of the Microprocessor 1015 in order to form an interleaved frame in the manner described above. Following the interleaving process, the interleaved frame is output by the Interleaver RAM 1040 to a Serial Interface 1050 for transmission to a receiving apparatus over a WAN via a modem, for example.

Although components of an exemplary apparatus embodying the present invention have been described in connection with the assembly of frames of data, the apparatus is also provided with components which are employed for the disassembly of those frames.

In particular, the inventive apparatus is provided with a Deinterleaver RAM 1060, which is used to deinterleave an interleaved frame. The deinterleaving operation occurs under the control of the Microprocessor 1015. Once an interleaved frame has been deinterleaved to provide individual frames, each individual frames is sent to a Reed-Solomon Decoder 1070, which removes the Reed-Solomon check-bytes and corrects any bit errors of the frame. However, if the Reed-Solomon Decoder 1070 is unable to correct the frame, then all the data in the frame is discarded.

Subsequently, each of the corrected frames are output by the Reed-Solomon Decoder 1070 to a RAM Buffer 1080. The Microprocessor 1015, which is also employed as a disassembler of the present invention, disassembles each corrected frame output by the Reed-Solomon Decoder 1070 and separates the data payload of each frame into its individual components (e.g. ATM cells and/or packets) in accordance with information provided in the frame header of the frame. However, any packets included within a frame should be decompressed into ATM cells before any additional processing is carried out.

The ATM cells are then output to the ATM Cell Processor 1010 which appends error correction information to the header of each ATM cell. Thereafter, the ATM cells are output to the Line Interface 1000 from the ATM Cell Processor 1010. The Line Interface 1000 outputs the ATM cells to an ATM switch (not shown).

Figure 11A:
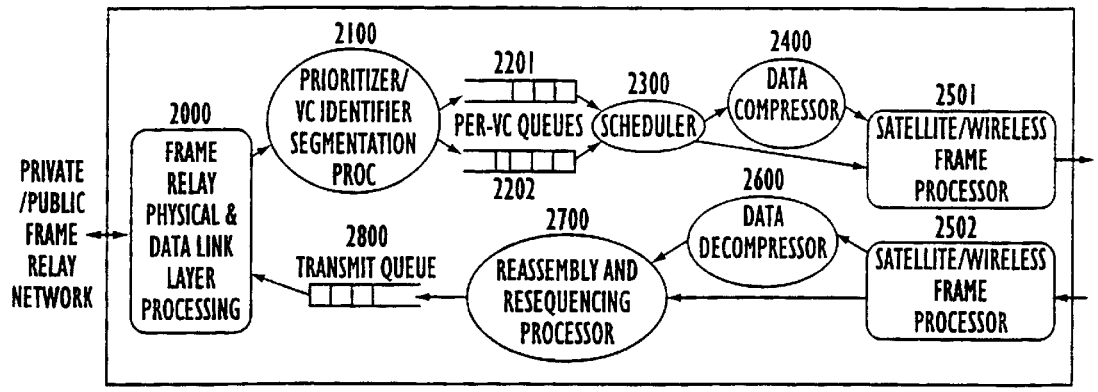
FIG. 11A illustrates a high level arrangement for a frame relay system.

FIG. 11A is a high level description of a frame relay system that performs frame relay processing to efficiently carry frame relay packets over wireless/satellite links. This system can perform the following:

Frame Relay processing at the Physical Layer and the Data Link Layer

Formatting of Data (variable length packets, segmentation and reassembly, resequencing)

Dynamic Forward Error Coding

Interleaving of frames (to spread the effect of burst errors)

Per-VC data compression

Prioritization and Scheduling

Header Compression

In the high level description of the various functions performed in the system seen in FIG. 11A, to the left of the diagram is the private/public frame relay network and to the right is the satellite/wireless link.

The illustrated system uses a robust, flexible frame format between the 2 communicating terminals which allows the transport of several variable sized Spackets (segmented packets) in a frame and also to carry a single Spacket over several frames, whichever the case might be. Also, the frame format allows fast synchronization and the exchange of coding information. Each frame contains Reed-Solomon check bytes that are used for error correction and to enhance the quality of the satellite/wireless link. The number of RS check bytes in a frame can be changed on the fly, without any loss of data, to compensate for varying link conditions. The decision to change the RS check bytes in a frame is based on the constant monitoring of the link quality. Several frames are also interleaved before transmission over the satellite/wireless link, to help spread the effect of burst errors over several frames, all of which can then be corrected by the FEC in the frames. Also, Virtual Channels (VCs) can be configured to be enabled for data compression, which means that the Spackets belonging to the VC are to be passed through a data compressor/decompressor combination to save bandwidth. VCs can also be configured to be either high or low priority VCs and the scheduler then, uses this information to fairly transmit the various Spackets over the satellite/wireless link.

In operation, a private or public frame relay network provides the frame relay packets to the frame relay physical and data link layer processing block 2000, where they are received and processed as specified in ITU recommendation Q.922 (Link Access Procedures for Frame Relay). The physical layer processing is similar to the processing of any HDLC data stream. This is the processing performed in most Frame Relay Access Devices (FRADs).

A frame relay packet received from the terrestrial network consists of payload data and a CRC field, and flags at the beginning and the end of the frame. The frame relay processing removes the flags and the CRC fields and transports only the payload section of the frame relay packet over the satellite link. The CRC and the flag information is regenerated at the receiving terminal and added to the packet before it is transmitted to the receive side terrestrial network.

Figure 11B:
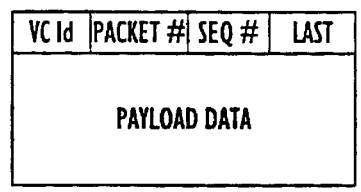
FIG. 11B illustrates a satellite/wireless frame structure that is applicable to a frame relay system.

In prioritizer/VC identifier/Segmentation processor 2100, the variable length frame relay packets are segmented into several smaller packets called Spackets. The Spackets allow efficient scheduling of packets belonging to multiple priorities and lossless data compression. FIG. 11B illustrates the various fields in a Spacket, whose content provides for efficient processing of the Spackets, as subsequently described.

In order to avoid an intolerable delay of high priority packets (e.g., audio and video) due to processing and transmission of low priority packets, Spackets belonging to a high priority packet could be transferred after a single Spacket from a low priority packet has been transferred, thus minimizing the delay variance that the high priority packet experiences. This technique minimizes the delay variance significantly and the satellite/wireless network performance is better than terrestrial networks, as far as delay variance is concerned. Thus, when each frame relay packet is segmented into one or more Spackets, all but the last Spacket are n bytes long. The last Spacket could also be n bytes long if the frame relay packet, to begin with, was of a length which was an integral multiple of n. A Spacket is then prepended with a header as shown in FIG. 6B that contains a Virtual Channel (VC) Identifier for the channel to which the packet belongs. Also, the header is supplied with the packet and the sequence numbers. The packet number increments for each new frame relay packet. The sequence number increments for each Spacket within the frame relay packet. Information about the priority of the packets and whether or not the packets are compressed is maintained locally. All this information is used to perform segmentation/reassembly, data compression/decompression, prioritization and scheduling. The "last field" indicates whether or not the Spacket is the last Spacket for the frame relay packet. If it is, then at the receiving terminal, the frame relay packet can be reassembled and transmitted over the terrestrial link.

The sizes of the various fields can be left to the discretion of the system designer. The VC Id field would either be the size of the entire VC field in the frame relay packet or could be the size specified in the header compression parameters. The size of the Packet number and Sequence number are also left to the system designer. The "last field" is a single bit. The size of the payload is determined by a trade-off between the overheads and the performance of the system. If the payload size is very low, the overheads will be very high, but the delay variance performance of the system will be very good. If the payload size is set to a large value, then the delay variance performance will be poorer but the overheads will be lower. Hence, the sizes would depend on the overheads the designer is prepared to allow, and the performance specifications of the system.

Next, queues of Spackets belonging to different VCs are stored for use by the scheduler in Per-VC or priority queues 2201 and 2202. In the case of a priority queue, high priority queues 2201 and low priority queues 2201 are maintained and the cells in each priority queue are transmitted on a FIFO basis. A more preferable mode of queuing is to have a queue for each VC, which is designated to have a high or low priority, and then store the cells belonging to each VC in its corresponding queue. Cells in these per-VC queues are also transmitted on a FIFO basis to preserve sequence integrity.

A scheduler 2300 sends Spackets belonging to various priorities or VCs over the satellite link. The scheduler is designed to be fair to VCs within a priority and between priorities as well. If the Spacket is to be compressed then it is sent to the Data Compressor 2400. The scheduler 2300 uses all the priority information for the various VCs and tries to be fair in the scheduling of the Spackets. A simple scheduling algorithm is to process all the high priority per-VC queues on a round-robin basis and then to process all the low priority per-VC queues on a round-robin basis. Another option for the scheduler would be to transmit at least one low priority cell every "n" high priority cells. This could assure some degree of fairness between priorities. A further option would be, within a priority, to use a weighted round-robin scheduling algorithm to transmit cells from per-VC queues, the weights reflecting the bandwidths that the VCs have subscribed for. This scheduling algorithm will attempt to schedule different VCs fairly.

Spackets which belong to a VC which has been specified to be compressed are compressed in data compressor 2400. To achieve loss-less data compression, the compression and decompression histories are reset every n Spackets, where n is a configurable parameter. With the FEC, the link is maintained at a very low BER. If a Spacket does get corrupted, then the resetting of the histories, will ensure that not more than n Spackets are affected.

Figure 11C:
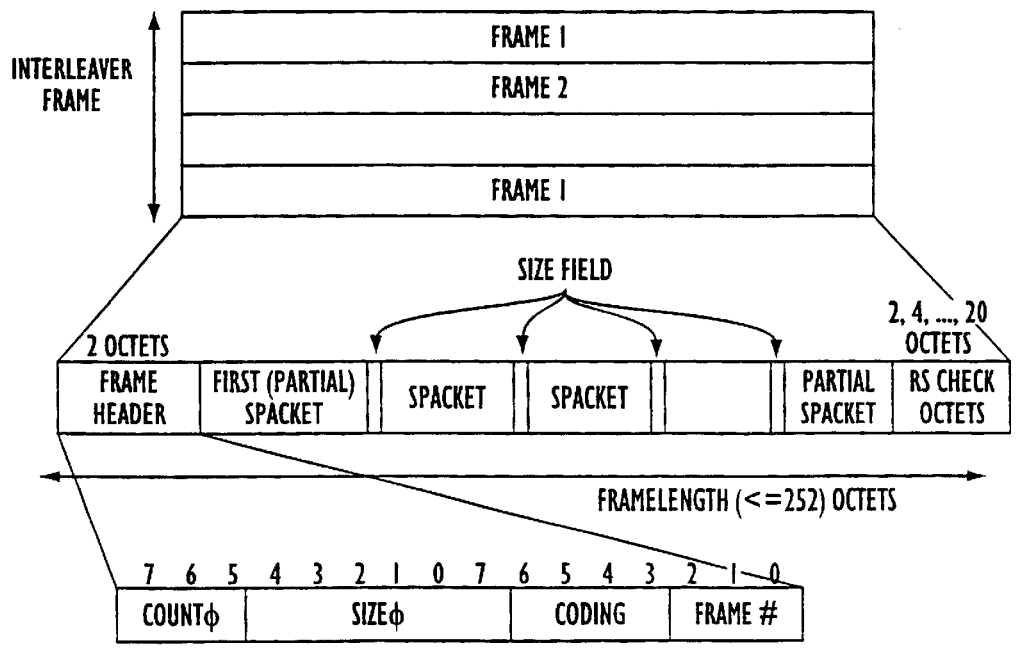
FIG. 11C illustrates the fields in a Spacket used in a frame relay system.

Finally, the compressed or uncompressed Spackets are provided to a satellite/wireless frame processor 2501, which incorporates the Spackets into a frame for transmission over the satellite/wireless link. This frame structure has been designed to facilitate fast frame synchronization, accommodation of several variable-size packets, fast recovery from lost frames, very low bandwidth overhead, as well as dynamic Reed-Solomon coding change without introducing data loss during the coding rate change transition. FIG. 11C shows the frame format.

The fundamental unit of transmission over the satellite/wireless link is a fixed size frame, which is n octets long. If an interleaving depth of I is used, then I such frames are used to compose an "interleaver frame". The interleaver rearranges the order of the bytes in the interleaver frame and transmits each byte sequentially over the satellite/wireless link. It should be noted that there are no special synchronization bits in this frame structure.

Each frame is n bytes long and consists of:

a 2-octet header followed by the frame payload, and terminated by 2t octets (t>0) of Reed-Solomon coding check bytes in the end.

TABLE 1

| | |
|---|---|
| Count0 | Number of Spackets in frame. Does not include the first Spacket, if any Includes the last Spacket, if any |
| Size0 | Size of first partial Spacket in frame divided by 4. |
| Frame | The frame number |
| Num | Each frame is sequentially numbered 0, 1, ..., 7, 0, ... |
| Coding | If FrameNum > 3, the coding field represents the number of Reed-Solomon octets/2 that will be used starting with the next frame numbered 0. Note that 0 is an invalid value for the coding field. If FrameNum = 0, the coding field represents the suggested value of the number of Reed-Solomon octets/2 that the other side should use for its own transmission. If the coding field value is 0 × F, the value implies that the transmitting terminal is not yet synchronized to its receiving bit stream. Note that 0 is an invalid value for the coding field. If FrameNum = 1, the least significant bit of the coding field is 1 if Spacket header compression is activated at the transmitting terminal, 0 otherwise. Other bits of the field are reserved for future use. If FrameNum is 2 or 3, the coding field shall be set to 0's. |

The payload contains a combination of several variable-size packets (the packets may contain compressed or uncompressed Spackets).

The rules for filling a frame payload with Spackets are as follows:

1. If the previously transmitted frame contained a partial Spacket at the end of the payload, the frame payload currently being transmitted begins with the next portion of that Spacket. This portion shall consume min(4 * size0, payload_size) octets of the payload, where size0=0. The actual size of this partial Spacket may be up to three octets less than 4 * size0, in which case the extra octets shall be filled with zeroes.
2. After the initial partial Spacket segment, the payload contains count0 Spackets where count0=0. If the last Spacket cannot be entirely contained in the payload, then only its initial portion is included in the payload. Each Spacket is preceded by a 1-octet-length (in octets) field followed by the Spacket contents. The length field contains the size of the Spacket in bytes.
3. If there are any octets left over in the payload, then the first such unused octet shall contain a zero. The rest of the octets, if any, shall be filled sequentially with the numbers i, i+1, i+2, . . . , where i is the octet number of the first such octet in the payload (octets in the payload are implicitly numbered 0, 1, . . . ).

From these rules, one can see that a frame payload may contain several Spackets and that the Spackets can be transmitted over more than one frame. A frame with no Spackets contains the sequence 0, 1, 2, . . . in the payload. A Spacket may be split across more than two frames if required.

This frame structure design allows the possibility of dynamically changing the Reed-Solomon code size by correspondingly changing the payload size but keeping the frame size constant. If the receiver "loses" a frame, for example, due to excessive bit errors in the frame, the size0 field allows rapid determination of the Spacket boundary on the very next frame. The frame header, shown in FIG. 11C, has four fields which are described in Table 1, wherein the Reed-Solomon check-bytes are the check-bytes generated by a standard Reed-Solomon algorithm with frame size=N bytes and number of check bytes=2t.

During the time that the system has not achieved receive synchronization, it sets the Reed-Solomon code value of its receiver and its transmitter to the maximum value. After the system achieves receive synchronization and it detects that the remote terminal has also achieved receive synchronization (i.e., the coding field in the received frame header of frame number 0 contains a valid code value), it activates an adaptive coding algorithm.

Transmissions from the satellite/wireless network are received and processed by a Satellite/Wireless frame processor 2502, which performs the inverse operation of that performed by the frame processor 2501, strips the Spackets from the frame format and produces the compressed and un-compressed Spackets.

Next, compressed Spackets are sent to Data Decompression module 2600, which decompresses the Spackets belonging to a VC which has been configured to be compressed. Compression and decompression histories are maintained in the Data compressor 2400 and the decompressor 2600, respectively. These histories are reset once every n Spackets, where n is a configurable parameter. This is done to minimize the effect that a lost or erroneous Spacket has on the following Spackets.

A reassembly and resequencing processor 2700 keeps track of Spackets belonging to all the VCs. The reassembly algorithm works on a per-VC basis. The Spackets for each VC are resequenced based on the sequence and packet numbers. The following rules are used to reassemble frame relay packets:

If a Spacket with a sequence number of zero is received, discard any previous incompletely assembled frame relay packet and start reassembling this new packet.

If a Spacket with the same packet number and VC Id, with a sequence number one more than the previous Spacket is received, then append this Spacket to the partially reassembled frame relay packet. If the "last field" indicates that the Spacket is the last Spacket of a frame relay packet, the frame relay packet has been completely assembled.

If a Spacket with sequence number which is out of sequence, and non-zero, is received, discard this new Spacket and any partially reassembled frame relay packet.

If the packet number of the Spacket received is not the same as that of the previous Spacket and the sequence number of the received Spacket is not zero, discard this new Spacket and any partially reassembled frame relay packet.

Optionally, a length field could be added to the frame relay packet at the transmitting terminal before it is segmented and transmitted over the satellite/wireless link. This length field could be used at the receiving terminal to check if the frame relay packet has been reassembled properly. If it hasn't then the frame relay packet is added to the transmit queue A transmit queue 2800 contains frame relay packets received from the remote terminal which will be transmitted over the terrestrial link. These packets are processed by the frame relay physical and data link layer processing module and transmitted over the terrestrial link.

Finally, the frame relay physical and data link layer processing module 2000 will reassemble the Spackets in to the appropriate frame relay configuration for transmission over the private or public network.

In order to save bandwidth, a header compression technique, similar to that used for ATM transmissions as described previously, may be used to compress the VC Id of a frame relay packet into a smaller value. This technique utilizes the fact that the number of VCs carried over the satellite/wireless link is not very large and can be compressed to a much smaller VC Id space. If header compression has been enabled in the system, then the VCs are mapped into a new value as specified by the size of the compressed VC field. This header compression information is periodically exchanged between the communicating terminals. Also, every time a new mapping is created, this information is asynchronously exchanged between the terminals before the actual transfer of the mapped packet begins.

For each of an ISDN/SS#7 and Internet system, the arrangement and operation would be substantially the same as seen in FIG. 11A, as would be apparent to one of ordinary skill in the art. The primary difference would lie in the content of element 2000, as the arrangement of the data on a private or public network for ISDN/SS#7 will be different from that for ATM, Internet and frame relay, as is well known. For example, the ISDN implementation would need to have a packetization/depacketization function added to the physical and data link layer processing block 2000 of FIG. 11A. Moreover, as among packet-based systems, since they each have unique characteristics that would need to be matched to the satellite/wireless link at the physical and data link layer processing block, other differences would exist for receiving and processing the data according to industry standards. By the same token, the physical and data link layer processing module 2000 will reassemble the information received from the satellite/wireless link in to the appropriate ISDN/SS#7 or Internet configuration for transmission over the private or public network.

Although certain preferred embodiments of the present invention have been described, the spirit and scope of the invention is by no means restricted to that which is described above.

What is claimed is:

1. A method of assembling a plurality of frames including cell/packet-formatted data according to a predetermined frame format for transmission in a communication signal in a wireless or satellite system, said method comprising the steps of:
    assembling a data payload for each frame having a first variable sizes including at least one of a partial data cell/packet and a complete data cell/packet;
    generating for each frame a block code having a second variable size which is used for error correction;
    providing for each frame a frame header which defines aspects of said frame; and
    combining said data payload, said block code and said format header to form a corresponding frame of said plurality of frames, said format header defining a first portion of said frame, said data payload defining a second portion of said frame and said block code defining a third portion of said frame.

2. The method defined in claim 1, wherein said data payload comprises a partial ATM data cell.

3. The method defined in claim 1, wherein said data payload comprises a complete ATM data cell.

4. The method defined in claim 1, wherein said data payload further comprises at least one of a partial packet of compressed data and/or a complete packet of compressed data.

5. The method defined in claim 4, wherein said at least one of a partial packet of compressed data and/or a complete packet of compressed data includes at least one partial ATM data cell.

6. The method defined in claim 4, wherein said at least one of a partial packet of compressed data and/or a complete packet of compressed data includes at least one complete ATM data cell.

7. The method defined in claim 4, wherein said data payload comprises a complete ATM data cell a partial ATM data cell and a complete packet of compressed data.

8. The method defined in claim 1, wherein the step of providing a frame header comprises the steps of:
    forming a first header field of said frame header which defines a number of data cell/packets in said data payload, said number of data cell/packets including only complete data cell/packets and any partial data cell/packet which follows said complete data cell/packets;
    forming a second header field of said frame header which defines a size of a first partial data cell/packet that precedes any complete data cell/packets included in said data payload; and
    forming a third header field of said frame header which defines a frame number of a corresponding one of said plurality of frames.

9. The method defined in claim 8, wherein said step of providing said frame header further comprises the step of:
    forming a fourth header field which defines a predetermined characteristic of said block code in accordance with said frame number of the s corresponding one of said plurality of frames.

10. The method defined in claim 9, wherein said predetermined characteristic corresponds to the second variable size of said block code.

11. The method defined in claim 9, wherein said predetermined characteristic corresponds to the second variable size of said block code of a current frame of said plurality of frames.

12. The method defined in claim 9, wherein said predetermined characteristic corresponds to the second variable size of said block code of a subsequent frame of said plurality of frames.

13. The method defined in claim 9, further comprising the step of selecting said second variable size of said block code in accordance with a bit error rate of said communication signal.

14. The method defined in claim 9, wherein said step of generating said block code comprises the step of generating said block code in accordance with Reed-Solomon Coding.

15. The method defined in claim 1, further comprising the step of selecting said second variable size of said block code in accordance with a bit error rate of said communication signal.

16. The method defined in claim 1, wherein said cell/packet is ATM-formatted.

17. The method defined in claim 1, wherein said cell/packet is one of frame relay-formatted, Internet-formatted or ISDN/SS#7-formatted.

18. The method defined in claim 1, wherein said step of assembling said data payload further comprises the step of including a pattern in said data payload for identifying the boundary of a corresponding frame in order to facilitate frame synchronization.

19. The method defined in claim 1, further comprising the step of interleaving a group of said plurality of frames.

20. The method defined by claim 19, wherein the step of interleaving further comprises the steps of:
    segmenting the frames of said group into a plurality of segments; and rearranging the order of said plurality of segments within said group.

21. The method defined by claim 20, wherein said step of interleaving is performed using a single buffer memory.

22. The method defined by claim 20, further comprising the step of transmitting said communication signal.

23. The method defined by claim 22, further comprising the step of transmitting said communication signal over a wireless network.

24. The method defined by claim 1, further comprising the step of transmitting said communication signal.

25. The method defined by claim 24, further comprising the step of transmitting said communication signal over a wireless network.

26. A method of disassembling a plurality of frames of a communication signal in a wireless or satellite system including cell/packet-formatted data, said frames each comprising, in accordance with a predetermined frame format, a frame header which defines aspects of a corresponding frame, a data payload having a first variable size, and a block code having a second variable size which is used for error correction, said data payload including at least one of a partial cell/packet, a complete cell/packet, a partial packet of compressed data and a complete packet of compressed data, said method comprising the steps of:
   receiving a frame of said plurality of frames;
   decoding said block code of said frame;
   correcting errors of said frame created during a transmission thereof; and
   extracting from said data payload the at least one of said partial cell/packets, said complete cell/packets, said partial packet of compressed data and said complete packet of compressed data in accordance with information included in said frame header.

27. The method defined in claim 26, wherein said second variable size depends on a bit error rate of said communication signal.

28. The method defined in claim 26, wherein said frame header comprises:
   a first header field which defines a number of data cell/packets in said data payload, said number of data cell/packets including only complete data cell/packets and any partial data cell/packet which follows said complete data cell/packets;
   a second header field which defines a size of a first partial data cell/packet that precedes any complete data cell/packets included in said data payload; and
   a third header field which defines a frame number of a corresponding one of said plurality of frames.

29. The method defined in claim 28, wherein said frame header further comprises a fourth header field which defines a predetermined characteristic of said block code in accordance with said frame number of the corresponding one of said plurality of frames.

30. The method defined in claim 29, wherein said predetermined characteristic corresponds to the second variable size of said block code.

31. The method defined in claim 29, wherein said predetermined characteristic corresponds to the second variable size of said block code of a current frame of said plurality of frames.

32. The method defined in claim 29, wherein said predetermined characteristic corresponds to the second variable size of said block code of a subsequent frame of said plurality of frames.

33. The method defined in claim 29, wherein said second variable size of said block code depends on a bit error rate of said communication signal.

34. The method defined in claim 26, wherein said cells or packets are ATM formatted.

35. The method defined in claim 26, wherein said cells or packets are one of frame relay formatted, Internet-formatted and ISDN/SS#7 formatted.

36. The method defined in claim 26, wherein a group of said plurality of frames is interleaved, and wherein prior to the step of extracting said group of said plurality of frames is de-interleaved.

37. The method defined in claim 36, wherein the group of said plurality of frames comprises a plurality of segments, and
   wherein the step of de-interleaving further comprises the steps of:
   rearranging the order of said plurality of segments within said group; and
   recreating each of the frames of said group in an original form.

38. The method defined by claim 37, wherein said step of interleaving is performed using a single buffer memory.

39. An apparatus for assembling a plurality of frames including cell- or packet-formatted data according to a predetermined frame format for transmission in a communication signal in a wireless or satellite system, said apparatus comprising:
   an assembling circuit for assembling a data payload for each frame having a first variable size, said data payload including at least one of a partial data cell/packet and a complete data cell/packet;
   a generating circuit for generating a block code having a second variable size for each frame, said block code being generated for error correction;
   a header generating circuit for generating a flame header for each frame which defines aspects of said frame; and
   a frame integrating circuit for combining said data payload, said block code and said format header to form a corresponding frame of said plurality of frames;
   wherein said format header defines a first portion of said frame, said data payload defines a second portion of said frame and said block code defines a third portion of said frame.

40. The apparatus defined by claim 39, further comprising: an interleaving circuit for interleaving a group of said plurality of frames.

41. The apparatus defined by claim 40, wherein said interleaving circuit further comprises:
   a frame segmenting circuit for segmenting the frames of said group into a plurality of segments; and
   a segment rearranging circuit for rearranging the order of said plurality of segments within said group.

42. The apparatus defined by claims 39, wherein said cell/packet format comprises one of an ATM, Internet, ISDN/SS#7 or frame relay-format.

43. The apparatus defined in claim 41, wherein said second variable size of said block code depends on a bit error rate of said communication signal.

44. An apparatus for disassembling a plurality of frames of a communication signal in a wireless or satellite system comprising cell- or packet-formatted data, said frames each comprising, in accordance with a predetermined frame format, a frame header which defines aspects of a corresponding frame, a data payload having a first variable size, and a block code having a second variable size which is used for error correction, said data payload including at least one of a partial cell or packet, a complete cell or packet, a partial packet of compressed data and/or a complete packet of compressed data, said apparatus comprising:
   a frame receiving circuit for receiving a frame of said plurality of frames;
   a decoding circuit for decoding said block code of said frame, said decoder correcting errors of said frame created during a transmission thereof; and a data extracting circuit for extracting from said data payload the at least one of said partial cell or packet, said complete cell or packet, said partial packet of compressed data and said complete packet of compressed data in accordance with information included in said frame header.

45. The apparatus defined by claim 43, wherein said group of said plurality of frames is interleaved, and wherein said apparatus further comprises a de-interleaving circuit for de-interleaving said group of said plurality of frames.

46. The apparatus defined by claim 44, wherein said cell or packet have one of an ATM format, Internet format, ISDN/SS#7 format or frame relay format.

47. The apparatus defined in claim 41, wherein said second variable size of said block code depends on a bit error rate of said communication signal.

48. A method of disassembling a plurality of frames of a communication signal in a wireless or satellite system including asynchronous transfer mode (ATM) formatted data, said flames each comprising, in accordance with a predetermined frame format, a frame header which defines aspects of a corresponding frame, a data payload having a first variable size, and a block code having a second variable size which is used for error correction, said data payload including at least one of a partial ATM cell, a complete ATM cell, a partial packet of compressed data and a complete packet of compressed data, said method comprising the steps of:

receiving a frame of said plurality of frames;

decoding said block code of said frame;

correcting errors of said frame created during a transmission thereof if a number of said error is less than a predetermined amount;

discarding said frame if the number of said errors is equal to or greater than a predetermined amount; and extracting from said data payload the at least one of said partial ATM cell, said complete ATM cell, said partial packet of compressed data and said complete packet of compressed data in accordance with information included in said frame header, if the number of said errors is less than said predetermined amount.

* * * * *